US012184926B2

(12) United States Patent
McIntosh et al.

(10) Patent No.: US 12,184,926 B2
(45) Date of Patent: Dec. 31, 2024

(54) SYSTEMS AND METHODS FOR IMPROVED SEARCHING AND CATEGORIZING OF MEDIA CONTENT ITEMS BASED ON A DESTINATION FOR THE MEDIA CONTENT MACHINE LEARNING

(71) Applicant: Google LLC, Mountain View, CA (US)

(72) Inventors: David McIntosh, San Francisco, CA (US); Erick Hachenburg, San Francisco, CA (US); Peter Chi Hao Huang, Pacifica, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/349,533

(22) Filed: Jul. 10, 2023

(65) Prior Publication Data

US 2023/0353820 A1 Nov. 2, 2023

Related U.S. Application Data

(63) Continuation of application No. 17/295,579, filed as application No. PCT/US2020/030739 on Apr. 30, 2020, now Pat. No. 11,743,530.
(Continued)

(51) Int. Cl.
*H04N 21/435* (2011.01)
*G06F 16/435* (2019.01)
(Continued)

(52) U.S. Cl.
CPC ......... *H04N 21/435* (2013.01); *G06F 16/435* (2019.01); *G06F 16/487* (2019.01);
(Continued)

(58) Field of Classification Search
CPC ............... H04N 21/435; H04N 21/431; G06Q 30/0637; G06Q 30/0639; G06F 16/435; G06F 16/487
(Continued)

(56) References Cited

U.S. PATENT DOCUMENTS 8,464,302 B1   6/2013   Liwerant et al.
9,799,081 B1  10/2017   Lewis et al.
(Continued)

OTHER PUBLICATIONS

International Preliminary Report on Patentability for Application No. PCT/US2020/030739, mailed Sep. 1, 2022, 7 pages.
(Continued)

*Primary Examiner* — Dominic D Saltarelli
(74) *Attorney, Agent, or Firm* — DORITY & MANNING P.A.

(57) ABSTRACT

Aspects of the present disclosure are directed to a computer-implemented method including receiving, by a user computing device, data that describes a destination for the media content item. Example destinations can include a location of a recipient of message including the media content item and a digital location (e.g., website, social networking page, etc.). The method can include selecting, by a computing system comprising the user computing device, one or more media content items based on the data that describes the destination for the media content item. Media content items that are more relevant and/or appropriate can be selected by considering the destination of the media content item. The selected media content item(s) can be provided for display by the user computing device in a dynamic keyboard interface.

18 Claims, 13 Drawing Sheets

Related U.S. Application Data

(60) Provisional application No. 62/979,666, filed on Feb. 21, 2020.

(51) Int. Cl.
 *G06F 16/487* (2019.01)
 *G06Q 30/0601* (2023.01)
 *H04N 21/431* (2011.01)

(52) U.S. Cl.
 CPC ..... *G06Q 30/0637* (2013.01); *G06Q 30/0639* (2013.01); *H04N 21/431* (2013.01)

(58) Field of Classification Search
 USPC .......................................................... 725/38
 See application file for complete search history.

(56) References Cited

U.S. PATENT DOCUMENTS

| | | | |
|---|---|---|---|
| 10,802,709 | B2 | 10/2020 | Won |
| 2002/0069415 | A1* | 6/2002 | Humbard ............... H04N 21/47 |
| | | | 725/38 |
| 2010/0269138 | A1* | 10/2010 | Krikorian ........ H04N 21/43074 |
| | | | 725/39 |
| 2013/0036117 | A1 | 2/2013 | Fisher et al. |
| 2013/0232200 | A1 | 9/2013 | Knapp |
| 2014/0372902 | A1 | 12/2014 | Bryant et al. |
| 2015/0149927 | A1 | 5/2015 | Walkin et al. |
| 2017/0083519 | A1 | 3/2017 | Huang et al. |
| 2017/0097969 | A1 | 4/2017 | Stein et al. |
| 2017/0102870 | A1 | 4/2017 | Won |
| 2017/0308289 | A1 | 10/2017 | Kim |
| 2018/0268567 | A1 | 9/2018 | Hart et al. |
| 2019/0138656 | A1 | 5/2019 | Yang et al. |
| 2019/0147060 | A1* | 5/2019 | Lau ....................... G06F 40/197 |
| | | | 709/206 |
| 2019/0245894 | A1 | 8/2019 | Epple et al. |
| 2019/0303998 | A1 | 10/2019 | Patil et al. |
| 2021/0286855 | A1 | 9/2021 | Bayer et al. |

OTHER PUBLICATIONS

International Search Report and Written Opinion for PCT/US2020/030739, mailed on Sep. 28, 2020, 10 pages.
Machine Translated Chinese Search Report Corresponding to Application No. 2020800158837 on Jul. 30, 2024.

* cited by examiner

SYSTEMS AND METHODS FOR IMPROVED SEARCHING AND CATEGORIZING OF MEDIA CONTENT ITEMS BASED ON A DESTINATION FOR THE MEDIA CONTENT MACHINE LEARNING

CROSS-REFERENCE TO RELATED APPLICATIONS

The present application is a continuation of U.S. Non-Provisional patent application Ser. No. 17/295,579, filed May 20, 2021, which claims benefit of and priority to PCT Patent Application Ser. No. PCT/US2020/030739, filed Apr. 30, 2020, which claims benefit of and priority to U.S. Provisional Patent Application Ser. No. 62/979,666, filed Feb. 21, 2020, the disclosures of which are hereby incorporated herein by reference in its entirety for all purposes.

FIELD

The present disclosure relates generally to searching and categorization of media. More particularly, the present disclosure relates to searching and categorization of media content items based on a destination for the media content item.

BACKGROUND

Conventional approaches for communicating between users of mobile devices may simply rely on SMS, messaging through a social networking application, or "texting." Internet or mobile device users may exchange messages through these various mediums. However, occasionally, users may wish to communicate via media content, such as GIFs (Graphics Interchange Format), or image files that include a static or animated set of images. Users may search the Internet for GIFs, copy them through an operating system's native web browser, and paste the GIFs in various messaging applications. These conventional systems are not well-suited to providing categorized content within a dynamic interface without expending resources or requiring manual intervention. Further, such conventional searching approaches lack contextual awareness with respect to the intended destination of the media content.

SUMMARY

Aspects and advantages of embodiments of the present disclosure will be set forth in part in the following description, or can be learned from the description, or can be learned through practice of the embodiments.

According to one aspect of the present disclosure, a computer-implemented method can include receiving, by a user computing device, data that describes a media content item destination; selecting, by a computing system comprising the user computing device, one or more media content items based on the data that describes the media content item destination; and providing, by the computing system for display by the user computing device in a dynamic keyboard interface, the media content item(s).

According to another aspect of the present disclosure, a computing system can include at least one processor and at least one tangible, non-transitory computer-readable medium that stores instructions that, when executed by the at least one processor, cause the at least one processor to perform operations. The operations can include receiving data that describes a media content item destination; selecting one or more media content items based on the data that describes the media content item destination; and providing the media content item(s) for display in a dynamic keyboard interface.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
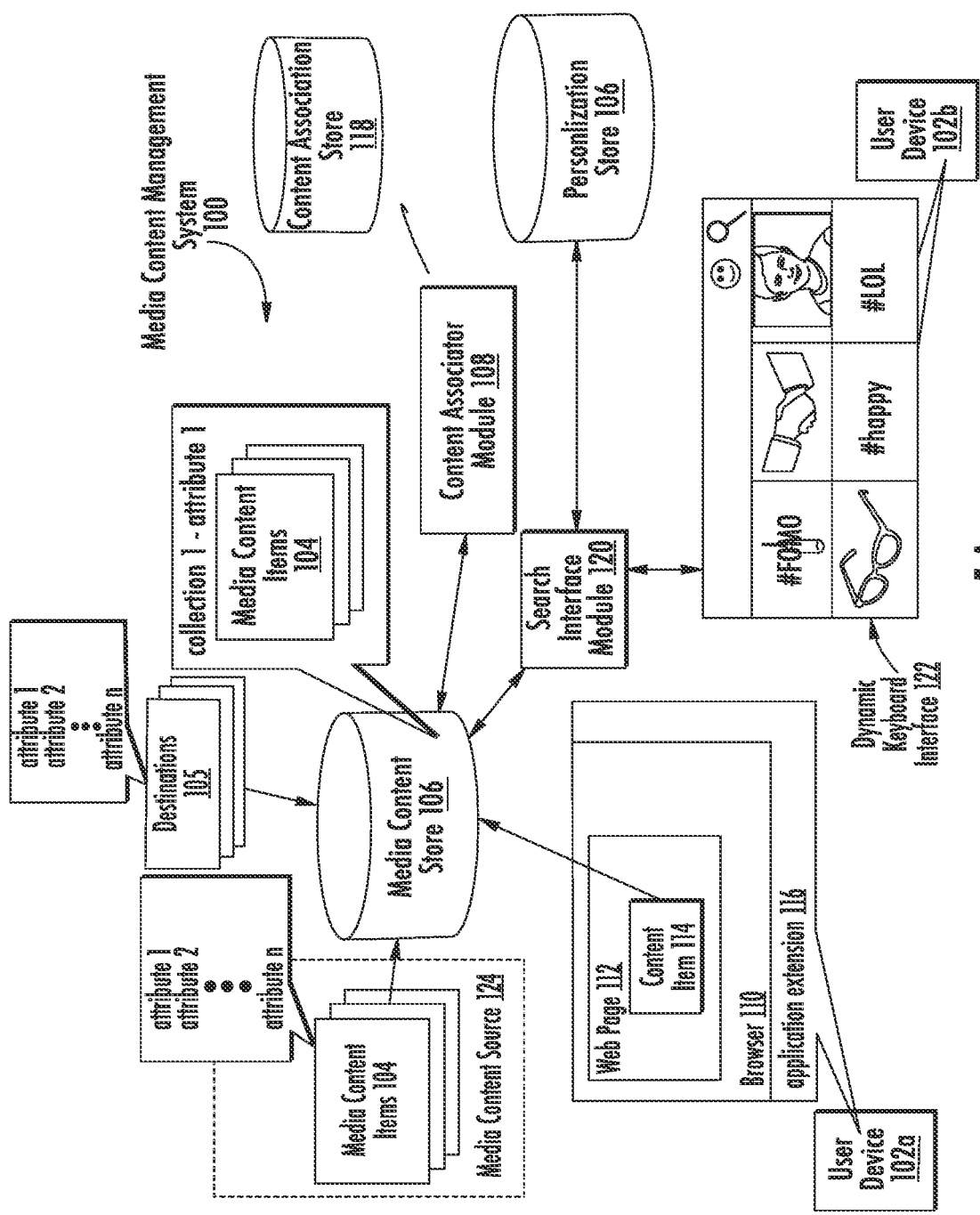
FIG. 1A is a high-level block diagram depicting a media content management system according to aspects of the present disclosure.

Reference numerals that are repeated across plural figures are intended to identify the same features in various implementations.

DETAILED DESCRIPTION

Overview

Generally, the present disclosure is directed to systems and methods for improved searching and categorizing of media content items, such as short videos. A computing system can retrieve and display media content items based, at least in part, on a destination (e.g., another user's computing device, a social network platform, etc.) for the media content items such that the selected media content items are more contextually relevant and useful for the user.

More particularly, according to aspects of the present disclosure, a user computing device can receive data that describes a destination for the media content item. For example, a user can access a messaging application or a social network application on the user computing device. The computing system can select one or more media content items based at least partially on the destination for the media content item. The computing system can provide the media content item(s) for display by the user computing device (e.g., for selection by the user to send to the destination). Thus, the computing system can select media content items that are more contextually relevant and useful for the user based on where the user is preparing to send the media content item(s).

In some embodiments, the computing system can receive a user input that describes the intended recipient of the message. For example, the user can open a particular application in which to insert the media content item once the user has selected the media content item. As another example, the user can provide an input directed to a dynamic keyboard interface that indicates a destination for the media content item (e.g., select the destination from a list or input a name of the recipient and/or application into the dynamic keyboard interface). Thus, the user can provide an input that describes a destination of the media content item.

In some embodiments, the computing system (e.g., the user computing device) can receive a search query for a media content item (e.g., via the dynamic keyboard interface displayed by the user computing device). In such embodiments, the computing system can select the media content item(s) based on the destination and search query. However, in other embodiments, the computing system can provide the media content item automatically, without receiving a search query. For instance, the dynamic keyboard interface can provide media content items as suggestions for the user based, at least in part, on the content of the message being drafted and the destination of the message (e.g., as an "auto-complete" function).

In some embodiments, the destination for the media content item can include a computer application in which the media content item is to be inserted. The computing system can select media content item(s) based on content that has been previously shared via the particular computer application by a user of the computing device and/or by other users. Example types of computer applications can include various social networking applications, messaging applications, e-mail applications, web browsing applications, and so forth.

In some embodiments, the computing system can select the media content item based on data that describes a location of the intended recipient of the message. For example, the data that describes the destination for the media content item can describe a location of a user computing device intended to receive the message. The media content item(s) can be selected based on cultural considerations associated with a country or geographical region in which the receiving user device is located. For instance, when a message is drafted to be sent to a country or geographical region that has a particular cultural sensitivity, the computing system can disfavor media content items in the search results that would be insensitive and/or contextually inappropriate based on the particular cultural sensitivity. Conversely, the computing system can favor media content items that would be more relevant and/or appropriate based on cultural considerations associated with the country or geographical region in which the receiving user device is located. For instance, the computing system can favor media content items associated with an upcoming holiday that is celebrated in the country of the intended recipient. Thus, the computing system can select media content item(s) to present to the user based on cultural information associated with the recipient's location.

As an example, a user can search for a media content item to share via a specific computer application, such as a specific social networking platform application. The computing system can select which media content item(s) to retrieve and display for the user based on characteristics of the specific computer application. For instance, many social network platforms offer computer applications. Different social networking platforms generally favors different types of content. As one example, media content items that are inspirational, thoughtful, and/or non-political can be more appropriate for a social networking platform that is generally focused on art and/or photography. As another example, media content items that are political, humorous, and/or edgy may be more appropriate for a different particular social networking platform; and so forth. Further, individual locations (e.g., pages, groups, etc.) within a particular social networking platform may favor particular types of content. In that example, the destination can be or include the individual location within the particular social networking platform. Thus, the computing system can select the media content items based on the destination being or including the specific social networking application and/or a location within the specific social networking application.

As another example, a user can use a web browsing application to access a web site. The user can search for a media content item to transmit (e.g., in a post, message, comment, or the like) to the web site via the web browsing application. In this example, the destination can be or include the specific web site.

In some embodiments, selecting the media content item(s) based on the destination of the media content item(s) can include considering one or more technical characteristics of the recipient computing device. For example, recipient computing devices can include desktop computers, laptop computers, tablets, smartphones, and the like. Technical characteristics of such recipient devices can include a physical size of a display screen, a resolution of the display screen, processing capability and/or availability, memory capability and/or availability, and/or connectivity bandwidth. As an example, selecting a media content item for a recipient device having a small and/or a low resolution display screen may include selecting a lower resolution media content item. As another example, selecting a media content item for a recipient device having may include selecting a media content item having a smaller file size, such as a media content item including fewer image frames (e.g., a shorter media content item), or the like. Thus, technical characteristics of the recipient computing device can be included considered when selecting media content item(s) based on the destination of the media content item(s).

In some embodiments, selecting the media content item(s) based on the data that describes the media content item destination can include comparing one or more technical characteristics of the media content item with one or more technical characteristics of the recipient computing device and/or one or more threshold values determined based on the technical characteristic(s) of the recipient computing device. For example, the media content item can be selected based on a resolution of the media content item can be selected and/or adjusted based on a maximum display resolution of the of the recipient device and/or of a region of the display of the device that is allotted for displaying the media content item. A media content item can be selected based on having a resolution that is less than a maximum display resolution of the recipient device and/or of a region of the display of the device that is allotted for displaying the media content item. Additionally or alternatively, a media content item that is larger than a maximum display resolution of the recipient device and/or of a region of the display of the device that is allotted for displaying the media content item can be re-sized (e.g., down-sampled) to a resolution that is equal to or less than the maximum display resolution and/or equal to or less than a resolution of a region of the display of the device that is allotted for displaying the media content item. A threshold resolution can be calculated based on the available storage space allotted for storing the media content item at the recipient device and/or the total available storage space of the recipient device. The media content item can be selected based on a comparison of the file size and/or number of frames of the media content item with the threshold storage space and/or threshold number of frames.

As another example, the media content item can be selected based on a comparison of a file size and/or number of frames of the media content item with an available storage space allotted for storing the media content item at the recipient device and/or a percentage of total available storage space of the recipient device. The media content item can be selected based on a comparison of the file size and/or number of frames of the media content item with the threshold storage space and/or threshold number of frames. Media content items can be selected based on having a file size and/or a number of frames that is less than the respective threshold. Additionally or alternatively, the media content item can be processed and downsized to reduce the file size and/or number of frames of the media content item based on an initial file size of the item or an initial number of frames being to large based on the available storage space allotted for storing the media content item at the recipient device and/or a percentage of the total available storage space of the recipient device. A threshold storage space and/or threshold number of frames can be calculated based on the available storage space allotted for storing the media content item at the recipient device and/or the total available storage space of the recipient device.

In some embodiments, media content items can be proactively suggested for selection by the user, for example, in a personal assistant context. Personal assistant features can be provided at an operating system level (e.g., of a smartphone, tablet, or the like). Aspects of the present disclosure can be incorporated in and/or provided through a personal assistant application and/or platform. In such personal assistance applications, context data associated with the user (e.g., user preference, previous actions and/or messages, etc.) can be considered when selecting media content items for display for selection by the user. For instance, the previous content shared between the user and a particular recipient can be considered when selecting one or more media content items based on the destination. Media content items that are selected in this manner can be more relevant and/or appropriate than media content items selected based on either the user's general sharing history or based on the recipient/destination. However, in some embodiments, data describing the destination and context data associated with the user can both be considered. For instance, media content items can be selected based on a union of the context data associated with the user and the data describing the destination. Such media content items can be more relevant that items selected based on either context data associated with the user or data describing the destination, alone. Thus, in some embodiments, personal assistant features can be provided based on both the context data associated with the user or data describing the destination.

One or more target attributes of the media content item(s) can be selected based on the destination for the media content item(s). Example target attributes for the media content item(s) can include tone, text characteristics (if text is included in the media content item), duration, emotion, and so forth. Example tones can include inspirational, thoughtful, political, aggressive, assertive humorous, and lighthearted. Example text characteristics can include color, bold vs. non-bold, all capital letters or lower case letters, simple block letters vs. ornate/decorative text and so forth. In the example that is described above regarding a social networking platform that favors art and/or photography, media content items displaying text that is ornate and/or decorative could be favored media content items displaying text that is bold and/or in all capital letters. Thus, one or more target attributes (e.g., tone, emotional content, aesthetic attributes, etc.) can be selected for the media content item(s) based on the destination for the media content item(s).

Aspects of the present disclosure can be employed within a dynamic keyboard interface for searching and/or browsing for media content items. The dynamic keyboard interface can be integrated in an operating system of the user device and/or provided or embedded across multiple computer applications (e.g., messaging applications, social networking applications, web browsing applications etc.). The dynamic keyboard interface can provide a search query box for the user to input a search query. The dynamic keyboard interface can display search results that include one or more media content items. The media content item(s) can be rendered in animation in the dynamic keyboard interface.

Multiple media content items can be provided for display (e.g., in the dynamic keyboard interface) for selection by the user. The multiple media content items can be sorted and/or arranged based on a variety of factors including the destination. Media content items that have been selected based in part on the destination can be more prominently displayed in the search results (e.g., displayed larger, towards the top of an arrangement of media content items, etc.). In some embodiments, the dynamic keyboard interface can include a scrollable window. Additional, less relevant results (e.g., media content items that were not selected based on the destination) can be displayed when the user scrolls or drags (e.g., downward or to the side) the scrollable window of search results.

The systems and methods of the present disclosure can provide a number of technical effects and benefits, including reducing the computational resources involved with searching for media content items and transmitting the resulting search results to a user computing device. The computing system can produce more relevant media content items by selecting the media content items based at least in part on the destination for the media content items. As such, the user can more easily locate an appropriate or a specific media content item, thereby reducing the number of searches the user needs to perform to locate a desired media content item, thereby reducing the consumption of computational resources during displaying and transmitting media content items.

Additionally, as discussed above, in some embodiments, selecting the media content item(s) based on the destination of the media content item(s) can include considering one or more technical characteristics of the recipient computing device. Example technical characteristics of such recipient devices include a physical size of a display screen, a resolution of the display screen, processing capability and/or availability, memory capability and/or availability, and/or connectivity bandwidth. Selecting media content item(s) based on such technical characteristics the recipient device can provide a solution to the technical problem of reducing delay in transmission to the recipient device (e.g., when bandwidth constrained) and/or display by the recipient device (e.g., if resource constrained). For one example, a lower resolution media content item that is selected based on the recipient device having a small and/or a low resolution display screen may be displayed by the recipient device using fewer computing resources (e.g., because down-sampling and/or resizing the media content item may be reduced or eliminated). As another example, a media content item that has a smaller file size, such as a media content item including fewer image frames (e.g., a shorter media content item), or the like can be selected for a recipient device having constrained resources (e.g., reduced processing power, reduced memory, and/or reduced connectivity bandwidth). Media content items can be selected based on a comparison of a technical characteristic of the media content item with a threshold value determined based on a technical characteristic of the recipient computing device. Additionally or alternatively, media content items can be processed, down-sampled, down-sized, or the like based on the comparison of a technical characteristic of the media content item with the threshold value determined based on a technical characteristic of the recipient computing device. Transmitting and/or displaying such a media content item can consume fewer resources by the recipient computing device and/or reduce latency associated with such transmission and/or display. Further, such selection of media content items can improve cross-device compatibility by preventing media content items that have too large of a file size and/or resolution from being sent to a recipient device that is not capable of displaying, receiving, and/or storing such media content items. Thus, aspects of the present disclosure provide a technical solution to a technical problem by considering technical characteristics of the recipient computing device when selecting media content item(s) based on the destination of the media content item(s).

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web email service).

With reference now to the Figures, example embodiments of the present disclosure will be discussed in further detail.

Example Devices and Systems

FIG. 1A is a high-level block diagram depicting a media content management system 100, according to some embodiments. The media content management system 100 may receive media content items 104 from media content sources 124 that are stored in a media content store 106. The media content management system 100 may also maintain a destination database 105 describing various attributes of common destinations for media content items 104.

FIG. 1A and the other figures use like reference numerals to identify like elements. A letter after a reference numeral, such as "102 *a*," indicates that the text refers specifically to the element having that particular reference numeral. A reference numeral in the text without a following letter, such as "102," refers to any or all of the elements in the figures bearing that reference numeral (e.g., "102" in the text refers to reference numerals "102 *a*" and/or "102 *b*" in the figures). Only two user devices 102 are illustrated in FIG. 1A in order to simplify and clarify the description. Administrators may access the media content management system 100 through a user device 102 (e.g., user devices 102 *a* and 102 *b*) through a separate login process, in one embodiment.

The media content items 104 may include various types of content, such as animated GIFs (a series of images), a static image, an audiovisual content item/video, as well as composite content items, such as multiple animated GIFs and/or image content. Media content items 104 are received to the media content management system 100 and stored into the media content store 106. A media content item 104 may have one or more attributes, such as content source, dimensions, content branding (e.g., by movie studios, product producers, etc.), characters included in the content, text strings included in the content, and so forth. Attributes may include metadata attributes, in one embodiment.

In the media content store 106, a media content item 104 may be stored with a collection, or a grouping of media content items 104. Collections may be generated by administrators of the media content management system 100, in one embodiment. A collection may be automatically generated, in one embodiment, based on one or more attributes shared by the media content items 104 in the collection. Additionally, collections may be generated and/or cross-referenced in connection with destinations 105 and the respective attributes of the destinations 105. For instance, each collection of media content items 104 and/or individual media content item 104 may be stored in association with a rank or score with respect to each destination 105 (e.g., based on tone, emotional content, aesthetic attributes, and so forth).

In an embodiment, a content association, or a unique identifier, may be used to denote a collection in the media content management system 100. For example, a media content item 104 may be "content associated" as part of the "#happy" collection in the media content management system 100. In one embodiment, a user or an administrator may content association the media content item 104 as part of the "#happy" collection. In another embodiment, the media content item 104 may be automatically associated, or have an automatically generated content association with the media content item 104 by a content associator module 108 using content associations stored in a content association store 118. In this way, content may be procured and categorized using content associations, such as "#happy," in the media content management system 100. Individual collections, or set of files, may each be labeled with a content association in the media content management system 100. A particular file may be associated with one or more content associations, in one embodiment.

In one embodiment, a user of the media content management system 100 may, through a user device 102 *a*, add content to a media content management system 100. For example, a user may have installed an application extension 116 onto the user device 102 *a* such that the user can "save" a content item 114 found through browsing a web page 112 using a browser 110 on the user device 102 *a*. By saving the content item 114 using the application extension 116, the URL (Uniform Resource Locator) may be stored in association with the content item 114 as an attribute of the content item, in one embodiment. The application extension 116 may, in one embodiment, include a downloadable application that enables a user to browse to a web page and collect media content items presented on the web page. As an example, a web page for a blog may post a particularly interesting content item that may or may not be available on the media content management system 100. Using the application extension 116, the user may browse to the web page 112, access a menu through the browser 110, and select an option to save one or more content items 114 that have been presented on the web page 112. In one embodiment, the application extension 116 is a mobile application that enables mobile browsers 110 to perform this functionality. In other embodiments, the application extension 116 may be a browser extension application or applet that may be downloaded through the browser 110 on a mobile device or desktop computer. In a further embodiment, the application extension 116 may enable users to directly upload content items 114 to the media content store 106 in the media content management system 100.

In another embodiment, a copy of the content item 114 is stored in the media content store 106 as part of a user operating the application extension 116 described above. In a further embodiment, a link or a URL of the content item 114 is stored in the media content store 106. In yet another embodiment, a copy of the content item 114 is stored onto the user device 102 *a* as part of a "saved" collection, or a user-generated collection on the user device 102 *a*. A user may sign into his or her account on various user devices 102 such that the collections may be synchronized between the user devices 102, including user-generated collections such as the "saved" collection.

Content items 114 may be presented on web pages 112 or otherwise accessible through web servers and may be procured by administrators of the media content management system 100 in other ways. For example, content owners, such as movie studios, television studios, brand owners, and other content generators, may partner with administrators of the media content management system 100 such that licensed content may be delivered and stored in the media content store 106. In such a procurement process, content owners may provide media content items 104 having pre-populated attributes, as mentioned above. A media content source 124, such as a content owner, may include content stores or databases on servers maintained and operated by the third-party sources or websites, for example. As part of the procurement process, content items 104 may be categorized into one or more collections by storing them in association with one or more content associations from the content association store 118. In one embodiment, content associations may be automatically generated by the content associator module 108 based on attributes of the content items 104. In another embodiment, content associations may be selected through one or more user interfaces or through an application programming interface (API). In a further embodiment, media content items 104 may be content associated by users of the media content management system 100 after being stored in the media content store 106 through one or more user interfaces on user devices 102.

As further illustrated in FIG. 1A, a dynamic keyboard interface 122 may be provided on a user device 102 *b*, for example. A dynamic keyboard interface 122 may include media content items 104 as well as collections of media content items 104. For example, the dynamic keyboard interface 122 may include a collection of media content items 104 content associated as "#FOMO." "#FOMO" is an expression in Internet slang, meaning "fear of missing out." Thus, media content items 104 included in the "#FOMO" collection may be about or include expressive statements about the specific expression "fear of missing out." One or more expressive statements may, in one embodiment, be extracted and/or otherwise interpreted from a media content item 104. For example, a curating user may content association a media content item 104 as "#FOMO" based on images in the media content item 104 being related to the expression "fear of missing out," such as a blinking text of "FOMO" in the images, captioned dialog from a movie or television show indicating the character in the images is lonely, has no friends, or otherwise has a fear of missing out on cool events. Through the procurement process, expressive statements may be mapped to content associations in the media content management system 100. These expressive statements may correlate to a user's searching intent in performing a search via animated inputs in the dynamic interface, in one embodiment.

As illustrated in FIG. 1A, the dynamic keyboard interface 122 may also include other animated media content items, or regions of the dynamic keyboard that implement animated inputs. Animated keys of two hands clasped in a handshake, a baby crying, a pair of glasses, a "#happy" content association, and a "#LOL" content association are illustrated as example animated keys, in addition to the "#FOMO" animated key further including a champagne bottle. Though not illustrated, the animated keys may include media content items 104 that are rendered in the dynamic keyboard interface 122 as animations, meaning the content may be moving in a constant loop within the keys. Media content items 104 may be preprocessed to enable the animated inputs in the dynamic interface, in one embodiment.

Upon selecting one of the animated keys in the dynamic keyboard interface 122, the user device 102 *b* may communicate with the media content management system 100 through a search interface module 120. In one embodiment, information specific to the user (e.g., the user's search history and/or the user's sharing history) may be stored as personalized information in a personalization store 150 for each user of the dynamic keyboard interface 122. Other personalized information may be captured about a user device 102, such as location (via GPS and/or IP Address), language keyboards installed, default language selection, phone information, contact information, messaging applications installed, and so forth. The data included in the personalization store 150 may be used as one or more factors by the search interface module 120 in determining the search intent of the user, for example. As further illustrated in FIG. 1B, the dynamic keyboard interface 122 may be rendered on the user device 102 *b* through a dynamic keyboard application 130 installed on the user device 102 *b*. The dynamic keyboard application 130 may install a dynamic keyboard user interface 132 that enables the dynamic keyboard interface 122 to be accessed throughout the user device 102 *b* as a third-party keyboard. In this way, a messaging user using a messaging application 140 and may access the dynamic keyboard interface 122 from within the messaging application 140.

Figure 1B:
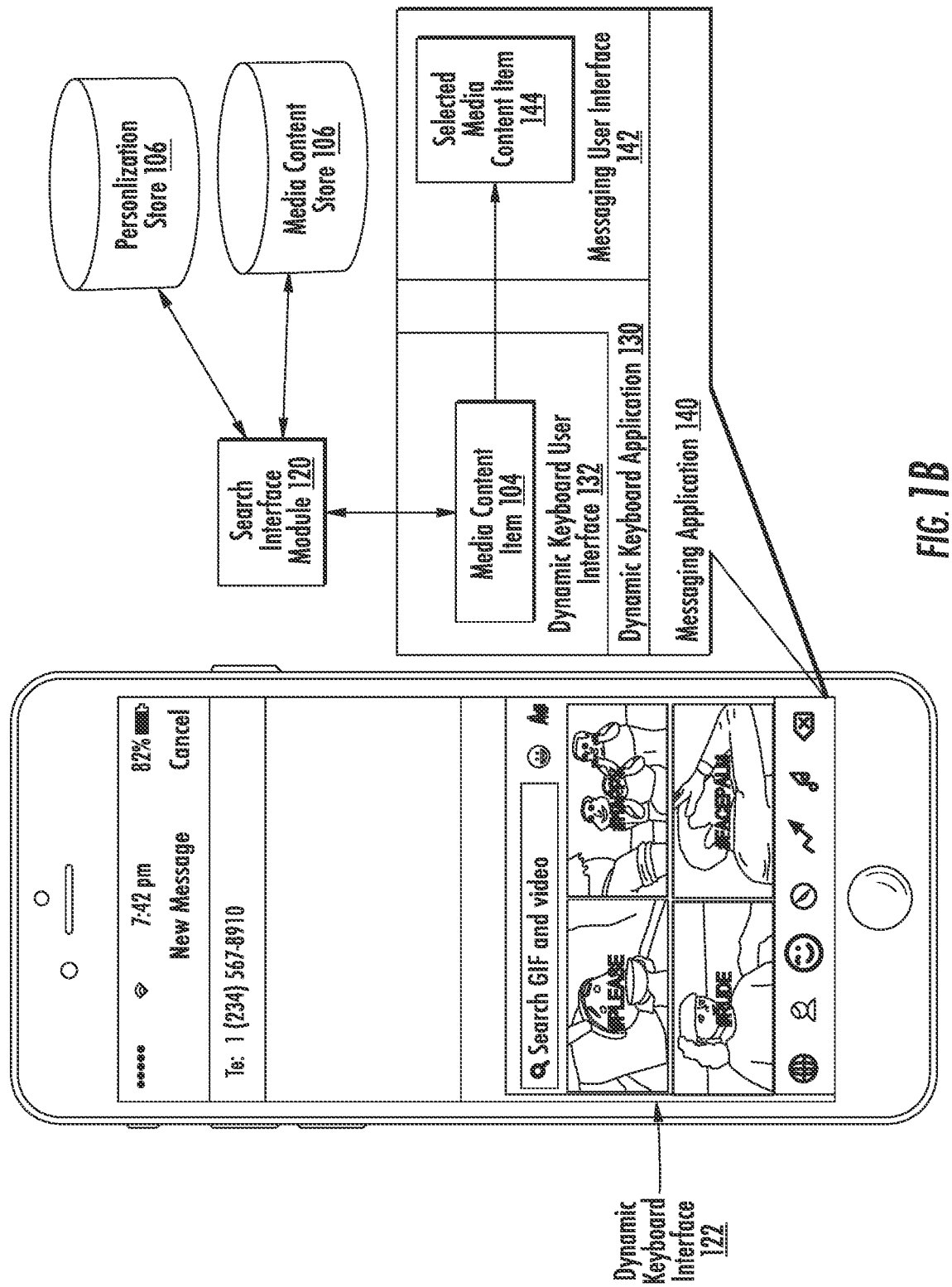
FIG. 1B is a high-level block diagram depicting a process of performing a search to implement animated inputs in a dynamic interface according to aspects of the present disclosure.

FIG. 1B is a high-level block diagram depicting a process of performing search to implement animated inputs in a dynamic interface, in an embodiment. As further illustrated in FIG. 1B, media content items 104 are rendered in the dynamic keyboard interface 122 through the dynamic keyboard user interface 132 communicating with the search interface module 120. In one embodiment, a set of collections may be selected for display on the dynamic keyboard interface 122. As illustrated in FIG. 1B, the dynamic keyboard interface 122 includes "#PLEASE," "#HAPPY," "#RUDE," and a "#FACEPALM" collections. Although the hashtag symbol ('™') is used in the examples included here, content associations do not necessarily need to start with a hashtag. The displayed collections can be selected based at least in part on the destination for the media content items 104.

By selecting an animated key on the dynamic keyboard interface 122, the collection of media content items 104 may be retrieved from the media content store 106 by the search interface module 120 and then rendered by the dynamic keyboard user interface 132 in the dynamic keyboard interface 122. In this way, the searching user is searching the media content management system 100 by using the selected content association, such as "#HAPPY." The retrieved collection of media content items 104 may be rendered within the dynamic keyboard interface 122. Further, the particular media content items that are selected for display from the "#HAPPY" collection can be selected based on the destination (e.g., based on tone, emotional content, aesthetic properties, and so forth).

Because the "#HAPPY" collection may be updated and added to in real-time, a searching user may be presented with different media content items 104 as new items are added to the collection. As mentioned above, media content items 104 may be preprocessed to reduce the file size of the content, thus enabling the media content items 104 to be quickly rendered on the dynamic keyboard interface 122.

A searching user may then select a media content item from the dynamic keyboard interface 122 by touching or otherwise interacting with the dynamic keyboard user interface 132. The selected media content item 144 may then be transmitted or pasted into the messaging user interface 142 of the messaging application 140. In one embodiment, a selected media content item 144 is selected by clicking, tapping, or touching the dynamic keyboard interface 122 and holding the selected media content item 144 to "copy" the content so that it can be "pasted" into the messaging application 140 through the messaging user interface 142. This copy and paste method may take advantage of the operating system of the user device 102, in one embodiment, such that the selected media content item 144 is not stored permanently onto the user device 102. In another embodiment, a searching user may search for media content through a search field on the dynamic keyboard interface 122, described further herein. In this way, media content items 104 may be shared through any messaging platform available on the user's device. Personalized information may also be captured, as mentioned above, in the personalization store 150 through the search interface module 120, for example.

Further the personalization store 150 can store data describing the user's past interactions with particular destinations. The personalization store 150 can store data describing attributes of media content items 104 that have been previously shared or sent to respective different destinations by the user. For example, the personalization store 150 can store data indicating that the user generally posts media content items that are inspirational and/or artistic to one particular destination, yet posts media content items that are political to another particular destination. This information can be used to personalize the selection of the media content items 104 based on the destination.

Figure 1D:
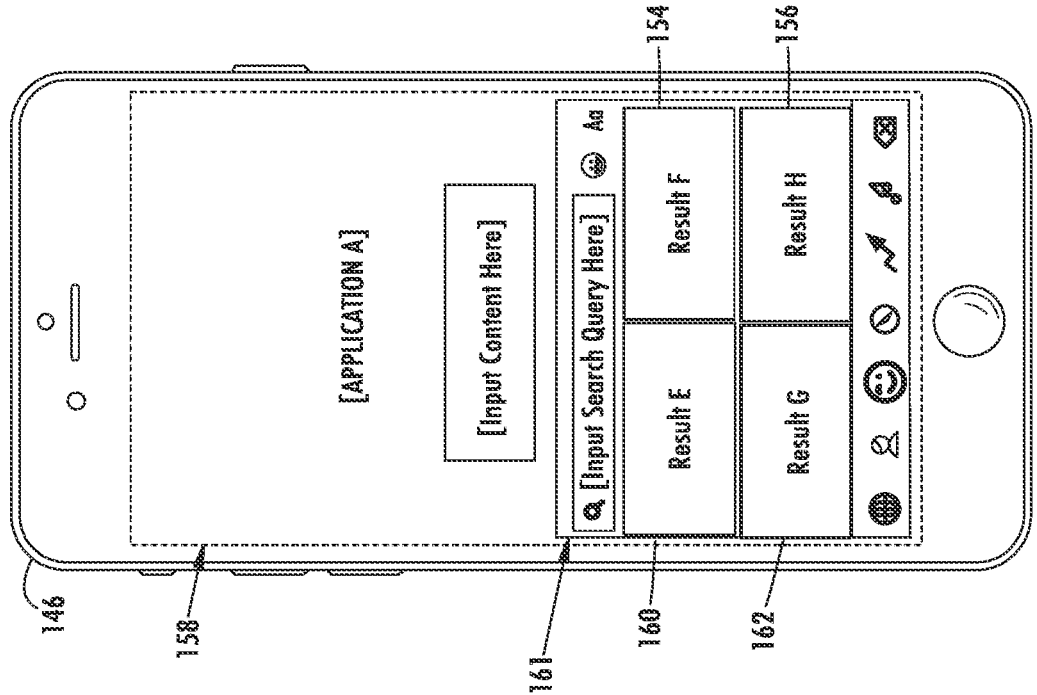
FIG. 1D illustrates another example user computing device displaying an application interface and a dynamic keyboard interface displaying search results including media content items selected based on a destination of the media content item(s) according to aspects of the present disclosure.
Figure 1C:
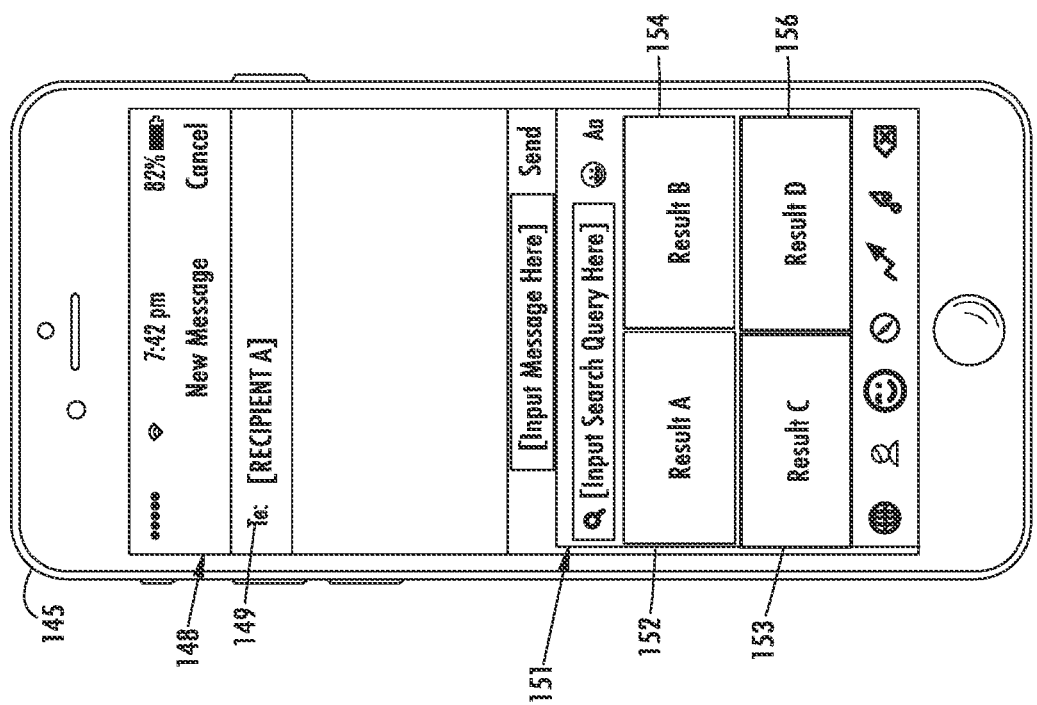
FIG. 1C illustrates an example user computing device displaying a message application interface and a dynamic keyboard interface displaying search results including media content items selected based on a destination of the media content item(s) according to aspects of the present disclosure.

FIGS. 1C and 1D illustrate, respectively, an example first user computing device 145 and an example second user computing device 146. Referring to FIG. 1C, the user computing device 145 can receive data that describes a destination for a media content item. For example, a user can open or select a messaging application (e.g., from a home page of an operating system user interface) on the user computing device 145. In response, the user computing device 145 can display a messaging application interface 148. The user can provide a user input (e.g., via a recipient input box 149) that describes the intended recipient of the message. For instance, the user can select a contact (e.g., "Recipient A") to whom to send the media content item. Thus, in this example, the destination is Recipient A's user computing device.

In some embodiments, the computing system (e.g., the user computing device) can receive a search query for a media content item (e.g., via the dynamic keyboard interface displayed by the user computing device). In such embodiments, the computing system can select the media content item(s) based on the destination and search query. However, in other embodiments, the computing system can provide the media content item automatically, without receiving a search query. The dynamic keyboard interface can provide suggestions for media content items based on the content of the message being drafted and the destination of the message.

The computing system can select one or more media content items 152, 153, 154, 156 based at least partially on the destination for the media content item(s) and can provide the media content item(s) 152, 153, 154, 156 for display in a dynamic keyboard interface 151 displayed by the user computing device 145. Thus, the computing system can select media content items 152, 153, 154, 156 that are more contextually relevant and useful for the user based on where the user is preparing to send the media content items 152, 153, 154, 156.

The data that describes the destination can describe a geographic location of the user computing device intended to receive the message (e.g., Recipient A's user computing device). The computing system can select the media content item(s) 152, 153, 154, 156 for display to the user based on cultural considerations associated with a country or region in which the receiving user device is located (e.g., Recipient A's user computing device). For instance, when a message is drafted to be sent to a country or region (e.g., the country where Recipient A's user device is located) having a particular cultural sensitivity, the computing system can disfavor media content items in the search results (e.g., media content items 152, 153, 154, 156) that may be insensitive and/or contextually inappropriate based on the particular cultural sensitivity of that destination (e.g., country or region). Such media content items can be excluded or displayed only in additional search results (e.g., that are not immediately displayed). Conversely, the computing system can favor (e.g., display more prominently in search results) media content items that would be more relevant and/or appropriate based on cultural considerations of the message recipient. For instance, the computing system can favor media content items associated with an upcoming holiday that is celebrated in the country of the intended recipient (e.g., Recipient A). Thus, the computing system can select media content item(s) 152, 153, 154, 156 to present to the user that are more contextually appropriate based on cultural information associated with the recipient's location.

Referring to FIG. 1D, as anther example, a user can search for a media content item to share via a specific computer application, "Application A." The user can open the specific computer application to provide an input to the computer system that describes a destination of the media content items. An application interface 158 for Application A can be displayed. A dynamic keyboard interface 161 can be displayed with an application interface. The computing system can select one or more media content items 160, 162, 164, 166 based at least partially on the destination for the media content item(s) and can provide the media content item(s) 160, 162, 164, 166 for display by the user computing device 146. Thus, the computing system can select media content items 160, 162, 164, 166 that are more contextually relevant and useful for the user based on where the user is preparing to send the media content items 160, 162, 164, 166.

For instance, the specific computer application can be or include a social networking application (e.g., for sharing content with other users). The computing system can select which media content item(s) to retrieve and display for the user based on characteristics of the specific computer application. Different social networking platforms generally favors different types of content. Media content items that are inspirational, thoughtful, and/or non-political can be more appropriate for a social networking platform that is generally focused on art and/or photography. Media content items that are political, humorous, and/or edgy may be more appropriate for a different particular social networking platform, and so forth. Further, individual locations (e.g., pages, groups, etc.) within a particular social networking platform may favor particular types of content. In that example, the destination can be or include the individual location within the particular social networking platform. Thus, the computing system can select the media content items 160, 162, 164, 166 based on the destination being or including the specific social networking application (e.g., "Application A") and/or a location within the specific social networking application.

As another example, the specific application can be or include a web browsing application for accessing and/or interacting with web sites. The user can search for a media content item to transmit (e.g., in a post, message, or the like) to the web site via the web browsing application interface (corresponding to interface 158 in this example). The destination can be or include the specific web site. For instance, when a user is drafting a post for a particular website, the computing system can select media content items 160, 162, 164, 166 that are contextually relevant and/or appropriate for the particular website.

As another example, selecting the media content item(s) 160, 162, 164, 166 based on the destination of the media content item(s) 160, 162, 164, 166 can include considering one or more technical characteristics of a recipient computing device. For example, recipient computing devices can include desktop computers, laptop computers, tablets, smartphones, and the like. Technical characteristics of such recipient devices can include a physical size of a display screen, a resolution of the display screen, processing capability and/or availability, memory capability and/or availability, and/or connectivity bandwidth. As an example, selecting a media content item for a recipient device having a small and/or a low resolution display screen may include selecting a lower resolution media content item. As another example, selecting a media content item for a recipient device having may include selecting a media content item having a smaller file size, such as a media content item including fewer image frames (e.g., a shorter media content item), or the like. Thus, technical characteristics of the recipient computing device can be included considered when selecting media content item(s) 160, 162, 164, 166 based on the destination of the media content item(s) 160, 162, 164, 166.

Referring to FIG. 1D, multiple media content items 160, 162, 164, 166 can be selected based on the destination and provided for display (e.g., in the dynamic keyboard interface 161) for selection by the user. The multiple media content items 160, 162, 164, 166 can be sorted and/or arranged based on a variety of factors including the destination. The media content items 160, 162, 164, 166 that have been selected based in part on the destination can be more prominently displayed in the search results (e.g., displayed larger, towards the top of an arrangement of media content items, etc.). For instance, the search results (including 160, 162, 164, 166) can be displayed in the dynamic keyboard interface 161 as a scrollable window. The media content items selected based on the destination can be displayed in the dynamic keyboard interface in response to receiving the search query. Additional results that were not selected based on the destination can be displayed in response to the user sliding or shifting (e.g., downward or to the side) the scrollable window of search results.

Figure 2A:
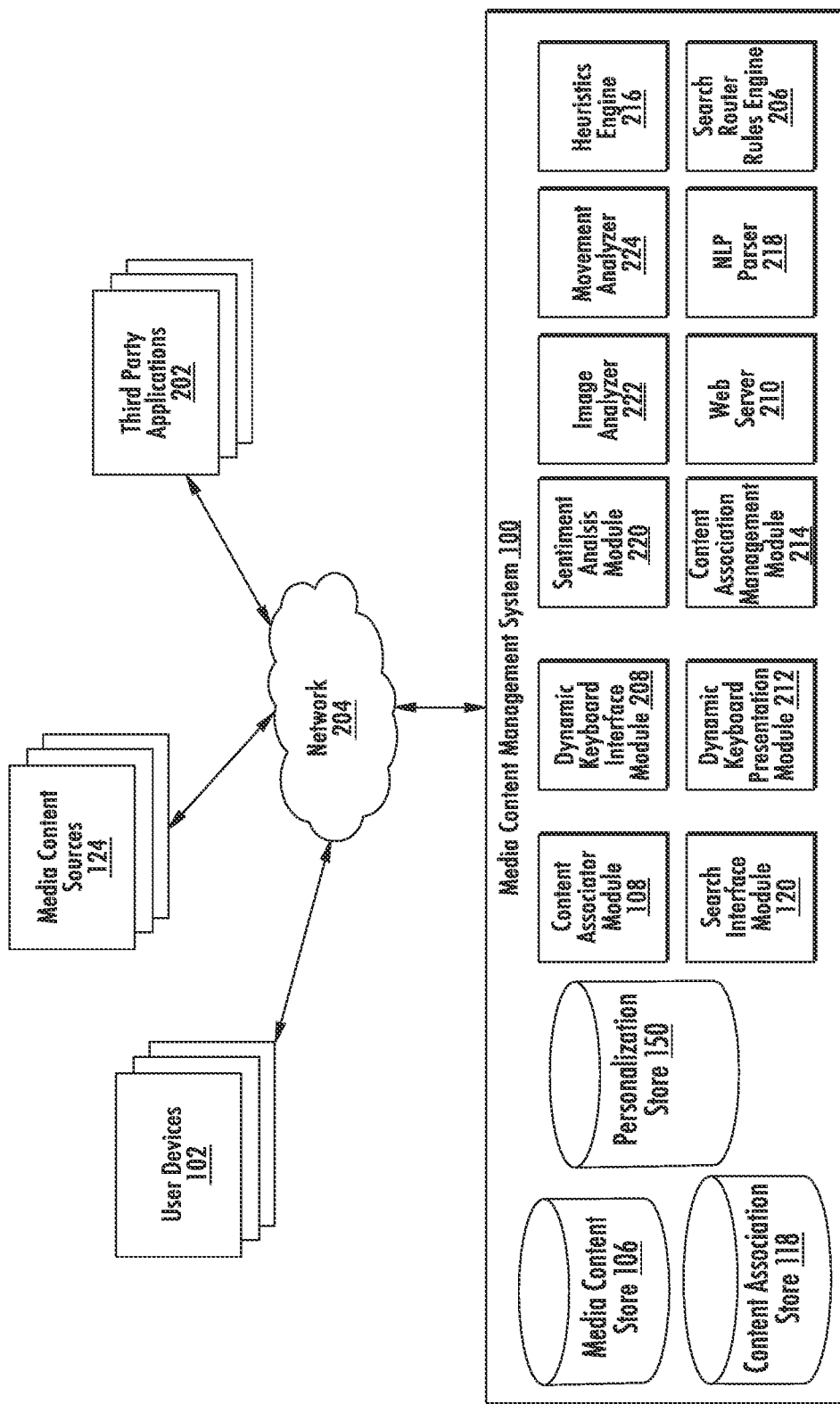
FIG. 2A is a network diagram of a system for procuring, organizing, and retrieving expressive media content in a media content management system, showing a block diagram of the media content management system, according to an embodiment according to aspects of the present disclosure.

FIG. 2A is a network diagram of a system for categorizing procured content for performing search in a media content management system, showing a block diagram of the media content management system, according to an embodiment. The system environment includes one or more user devices 102, media content sources 124, third-party applications 202, the media content management system 100, and a network 204. In alternative configurations, different and/or additional modules can be included in the system.

The user devices 102 may include one or more computing devices that can receive user input and can transmit and receive data via the network 204. In another embodiment, the user device 102 can be a device having computer functionality, such as a personal digital assistant (PDA), mobile telephone, smart-phone, wearable device, etc. The user device 102 is configured to communicate via network 204. The user device 102 can execute an application, for example, a browser application that allows a user of the user device 102 to interact with the media content management system 100. In another embodiment, the user device 102 interacts with the media content management system 100 through an application programming interface (API) that runs on the native operating system of the user device 102.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2A contains a block diagram of the media content management 100. The media content management system 100 includes a media content store 106, a content association store 118, a personalization store 150, a search interface module 120, a content associator module 108, a dynamic keyboard interface module 208, a web server 210, a dynamic keyboard presentation module 212, a content association management module 214, a sentiment analysis module 220, an image analyzer module 222, a movement analyzer 224, a natural language processing (NLP) parser 218, a heuristics engine 216, and a search router rules engine 206. In other embodiments, the media content management system 100 may include additional, fewer, or different modules for various applications. Conventional components such as network interfaces, security functions, load balancers, failover servers, management and network operations consoles, and the like are not shown so as to not obscure the details of the system.

The web server 210 links the media content management system 100 via the network 204 to one or more user devices 102; the web server 210 serves web pages, as well as other web-related content, such as Java, Flash, XML, and so forth. The web server 210 may provide the functionality of receiving and routing messages between the media content management system 100 and the user devices 102, for example, instant messages, queued messages (e.g., email), text and SMS (short message service) messages, or messages sent using any other suitable messaging technique. The user can send a request to the web server 210 to upload information, for example, images or media content are stored in the media content store 106. Additionally, the web server 210 may provide API functionality to send data directly to native user device operating systems.

A content associator module 108 may automatically generate one or more content associations for a media content item 104 in the media content management system 100 based on the attributes of the media content item 104. For example, machine learning techniques may be used by the content associator module 108 to determine relationships between media content items 104 and content associations stored in the content association store 118. In one embodiment, the content associator module 108 may identify one or more content sources, such as movie studios, movies, television studios, television shows, actors, genres, and so forth. In another embodiment, the content associator module 108 may automatically generate a content association for a media content item 104 based on an analysis of the image frames within the media content item 104. In yet another embodiment, the content associator module 108 may use one or more computer vision techniques and other image processing methods through various third party applications 202 to analyze the image frames within the media content item 104 to automatically generate one or more content associations to be associated with the content item. In one embodiment, the content associator module 108 may utilize one or more third party applications 202, the NLP parser 218, the sentiment analysis module 220, the image analyzer 222, the movement analyzer 224 and the heuristics engine 216 to analyze and parse text included in media content items 104 as well as analyze moving image frames of the media content items 104 to automatically generate content associations and/or automatically select content associations stored in the content association store 118. In another embodiment, an NLP parser 218 may be combined with a sentiment analysis module 220 and may be relied upon to analyze images and/or audiovisual content to determine a sentiment of the media content items 104. For example, an image analyzer 222 and a movement analyzer 224 may be used to detect and/or classify a sequence of images depicting a face smiling. A heuristics engine 216 may include a rule that automatically associates a media content item 104 having a sequence of images that have been analyzed to detect a smile with a "#happy" content association from the content association store 118 as the media content item 104 is stored within the media content store 106 in the media content management system 100. Alternatively, or in addition to this analysis, an NLP parser 218 may parse text strings included in the images and determine a match to the word "AWESOME." Additionally, the NLP parser 218 may interpret the smile to mean a positive sentiment. A sentiment analysis module 220 may indicate that the word "AWESOME" is associated with a strong positive sentiment, and a heuristics engine 216 may include a rule that automatically associates the "#happy" content association (and/or other positive content associations) with media content items 104 that have a strong positive sentiment.

The media content store 106 may include or be associated with the destination database 105 that describes various attributes of common destinations for media content items.

A search interface module 120 may manage search requests and/or search queries for media content items 104 in the media content management system 100 received from user devices 102, in an embodiment. A search query may be received at the search interface module 120 and processed by a search router rules engine 206, in one embodiment. In another embodiment, a search interface module 120 may receive a request for a collection from a user device 102 based on a content association, such as "#HAPPY," "#RUDE," "#FOMO," and so forth as a result of a selection of an animated key or a text search. The search interface module 120 may communicate the search query to the search router rules engine 206 to process the request, in an embodiment.

A content association management module 214 may manage one or more content associations associated with each media content item 104 in the media content management system 100. Content associations may be associated with media content items 104 through the content association management module 214 through various interfaces, such as user interfaces and application programming interfaces (APIs). APIs may be used to receive, access, and store data from media content sources 124, third party applications 202 (and/or websites), and user devices 102. The content association management module 214 may manage how content associations are associated with the media content items 104 through various procurement methods, in one embodiment. Additionally, content associations and/or collections may be generated and/or cross-referenced in connection with data describing the destinations 105 and the respective attributes of the destinations 105. For instance, each collection of media content items 104 and/or individual media content item 104 may be stored in association with a rank or score with respect to each destination 105 (e.g., based on tone, emotional content, aesthetic attributes, and so forth).

A dynamic keyboard interface module 208 may manage interface communications between the media content management system 100 and user devices 102. For example, the dynamic keyboard interface 122, as illustrated in FIGS. 1A through 1C, may include a menu selection element that enables the searching user to view trending media content on the media content management system 100. "Trending" media content may include frequently viewed and/or frequently shared content by users of the media content management system 100. The dynamic keyboard interface module 208 may receive the request for trending media content and retrieve media content items 104 from the media content store 106 that have the highest number of shares in the past hour, for example. The dynamic keyboard interface module 208 may then, through the dynamic keyboard presentation module 212, provide the retrieved trending media content items to the dynamic keyboard interface 122 through the dynamic keyboard application 130, in one embodiment. The dynamic keyboard presentation module 212 may determine how the media content items are presented and in what order, for example. In one embodiment, if no media content items 104 satisfy a search query or request from a user device, the dynamic keyboard interface module 208 may, in conjunction or in coordination with the search interface module 120 and search router rules engine 206, deliver other media content items 104 that are popular or have been shared. In one embodiment, content items may be selected by the dynamic keyboard interface module 208 from third party applications 202 (or websites), to be included in the search results or animated keys of the dynamic keyboard interface 122.

A heuristics engine 216 may include one or more heuristics rules to determine one or more outcomes. For example, the content associator module 108 may use the heuristics engine 216 to determine a ranking of candidate content associations for a media content item 104 based on the attributes of the media content item 104. Certain attributes may have various heuristic rules associated with them, such as visual movements (e.g., detected smiles may be associated with a "#HAPPY" content association), visual characteristics (e.g., blinking text may indicate an importance of the text string, or a hashtag symbol may indicate a particular content association), content sources, characters included in the media content item, and other attributes. Various heuristic rules may be generated by administrators to automatically generate content associations for content items based on attributes, in one embodiment. In another embodiment, heuristic rules may also use ranges of parameters for various attributes. For example, thirty selections of a media content item 104 for sharing by a particular user may be used in a heuristic rule to present the same media content item in response to a search query from the particular user where there are few search results. The range here may be defined as a threshold number of shares, for example.

A sentiment analysis module 220 may provide analysis of various text received by the media content management system 100 to determine whether the text exhibits positive, negative, or neutral connotations. This information may be used by various modules to efficiently translate a search query to extract the expressive intent of the searching user. For example, a dictionary of terms may be used, in multiple languages, to determine whether text may be determined to have positive, negative, or neutral connotations. The sentiment analysis module 220 may, in one embodiment, use various third party applications 202 to perform this analysis. Using the sentiment analysis module 220, the search router rules engine 206 may provide one or more collections of media content items 104 based on the connotations of the search query, for example.

Figure 2B:
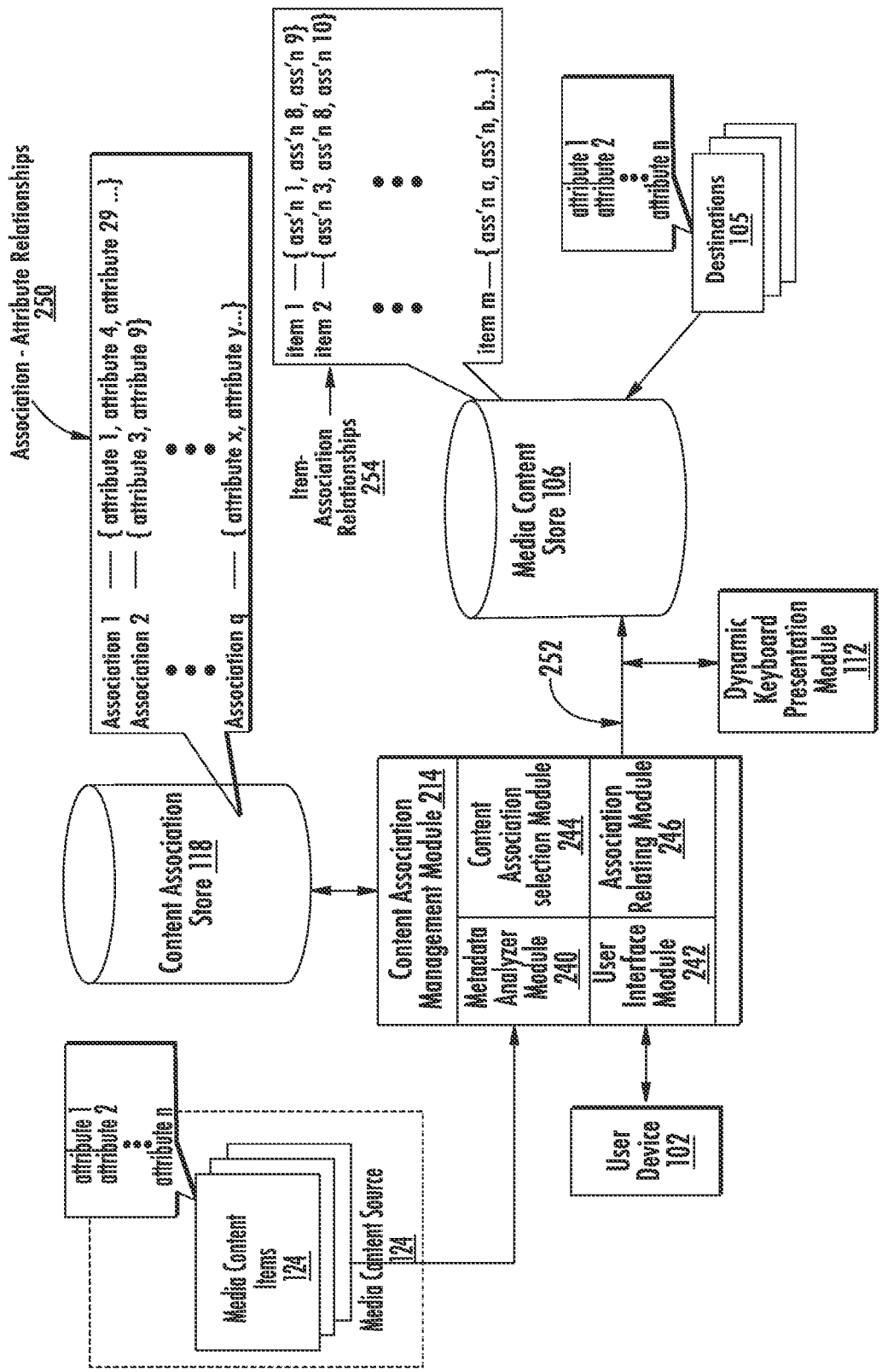
FIG. 2B is a high-level block diagram of a system for categorizing procured content for performing search in a media content management system according to an embodiment, according to aspects of the present disclosure.

FIG. 2B is a high-level block diagram of a system for categorizing procured content for performing search in a media content management system, according to an embodiment. A content association management module 214 may include a metadata analyzer module 240, a user interface module 242, a content association selection module 244, and an association relating module 246, in one embodiment.

As media content items 104 having one or more attributes are received in the media content management system 100 from a media content source 124, a metadata analyzer module 240 may generate one or more content associations based on the attributes of the media content items 104. For example, media content items 104 from a particular movie may be automatically content associated in a collection for that particular movie based on a movie metadata attribute associated with the media content items 104. In one embodiment, administrators of the media content source 124 may associate one or metadata attributes to the media content items 104. Metadata attributes may be stored in various ways in the source files of the media content items 104, such as header content associations within the source files, as well as other files associated with the source files, such as XML files describing content items being procured in batches by the media content system 100.

The metadata analyzer module 240 may parse through the metadata associated with media content items 104 and automatically generate and/or select content associations from the content association store 118 based on one or more rules, in one embodiment. As illustrated in FIG. 2B, the content association store 118 may store association-attribute relationships 250, such that attributes have been associated with content associations. In this way, the metadata analyzer module 240 may automatically assign a content association to a media content item 104 based on the association-attribute relationships 250 stored in the content association store 118.

Other metadata attributes that may be analyzed by the metadata analyzer module 240 includes an Internet Protocol (IP) address of the mobile device or user device used by a searching user or curating user. An IP address may provide an indication of a geographic location of a user, including country of origin. Alternatively, a Global Position System (GPS) of a mobile device may include a current geographic location of the user. As a result, different collections or content associations may be presented to the user based on the predominant language spoken at the geographic location of the user. In another embodiment, another metadata attribute that may be analyzed by the metadata analyzer module 240 includes the one or more languages selected by the viewing user. In this way, language preference may help inform searching intent, curating intent, or both. A word in French, for example, may have a completely different meaning in Indonesian. As a result, language and country of origin may be a metadata attribute that may be determined by a metadata analyzer module 240.

A user interface module 242 may provide one or more user interfaces for a user device 102, such as a computer or mobile device, to select one or more content associations for procured media content items 104. For example, a curating user may be given the ability to assign one or more content associations from the content association store 118 to media content items 104. In this way, the content association management module 214 enables manual selection of content associations for categorizing the procured media content items 104.

A content association selection module 244 may provide one or more content associations from the content association store 118 in one or more user interfaces provided by the user interface module 242, according to an embodiment. In one embodiment the content association selection module 244 may present predicted content associations based on the content association-attribute associations 250 stored in the content association store 118 for selection and/or confirmation by a curating user operating a user device 102. For example, a media content item 104 may have a genre attribute of comedy based on pre-populated information from the media content source 124. Because the "comedy" attribute may be associated with a "#HAPPY" content association, the media content item 104 may have been assigned the "#HAPPY" content association by the metadata analyzer module 240, in one embodiment. The content association selection module 244 may present the "#HAPPY" content association along with other related content associations in a user interface provided by the user interface module 242 for a curating user to assign or revoke content associations associated with the associated content item 104. The association-attribute associations 250 stored in the content association store 118 may include content associations that are related to other content associations, in one embodiment. For example, a "#HAPPY" content association may be related to a "LOL" and a "LMAO" content association because both LOL and LMAO include a "laughing" interpretation. As a result, other content associations may be presented for selection by a curating user, in one embodiment.

As part of the procurement process, media content items may be preprocessed 252 before being stored in the media content store 106. This enables the media content items 104 to be retrieved quickly and rendered seamlessly in the dynamic keyboard interface 122 on a user device 102. Pre-processing of media content items 252 may include reducing pixel count, modifying resolution definition, and other file size reduction techniques. The dynamic keyboard presentation module 212 may be used to perform this pre-processing of media content items 252, in one embodiment. Beneficially, pre-processing of media content items 252 enables a dynamic keyboard interface 122, presented to a user on a user device 102 b, to render at least two renderings of at least two media content items in animation and to display them concurrently in the dynamic keyboard interface 122.

An association relating module 246 may relate content associations to media content items 104 in the media content store 106. Content associations may be associated to content items automatically by a metadata analyzer module 240 (or other modules in the media content management system 100) or the content associations may be associated as a result of a selection of content associations received through a user interface provided by the user interface module 242. As illustrated in FIG. 2B, item-association relationships 254 are stored in the media content store 106. Each content item may have a content identifier and each content association may have a content association identifier such that the item-association relationships 254 may be stored in the media content store 106. As illustrated in FIG. 2B, a content item ("item") may be related to one or more associations ("ass'n"), and the item-association relationships 254 are stored in the media content store 106, for example.

Figure 2C:
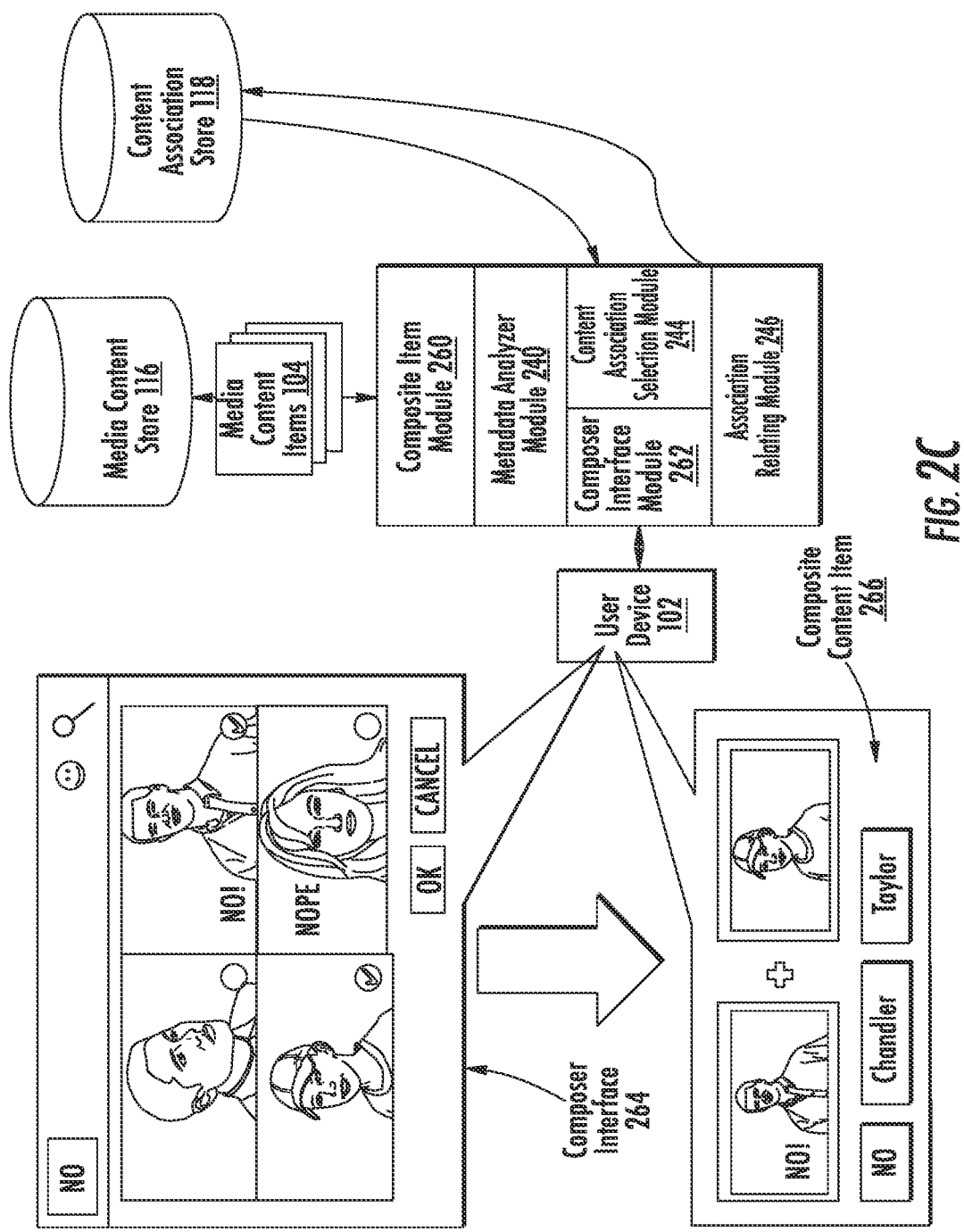
FIG. 2C is a high-level block diagram of a system for composing a composite content item in a media content management system according to aspects of the present disclosure.

FIG. 2C is a high-level block diagram of a system for composing a composite content item in a media content management system, according to an embodiment. A composer interface 264 may be provided on a user device 102 that enables a viewing user to search media content items 104 and select two or more content items to generate a composite content item. As illustrated, two content items have been selected in the composer interface 264 to create a composite content item 266 having the combined attributes of the two selected content items. For example, a viewing user may search for "No" through a search interface, described in more detail later. Several content items 104 may be retrieved that meet the search term, "No." A first selected content item may have been associated with content associations of "No" and "Chandler" while a second selected content item may have been associated with content associations of "No" and "Taylor." As a result, the composite content item 266 may include the content associations "No," "Chandler," and "Taylor." The composite content item 266 may be received by a composer interface module 262 and stored by the composite item module 260 as a media content item 104 in the media content store 106. As further illustrated in FIG. 2C, a composite item module 260 may operate in conjunction with, or include, a metadata analyzer module 240, a content association selection module 244, and an association relating module 246 that operate similarly as described above, in addition to a composer interface module 262.

In at least some embodiments, a composite content item 266 may be associated with an expressive statement that conveys a different meaning than the individual content items included in the composite content item 266. Returning to the example above, a first content item 104 with the character "Chandler" expressing the statement, "No," may convey a particular meaning to most users of the media content management system 100. A curating user of the media content management system 100 may associate other content associations with that particular content item 104, such as "#cool" and "FRIENDS." The second content item 104 depicting a celebrity, TAYLOR LAUTNER, may evoke a separate and different meaning from the first content item 104 depicting the character "CHANDLER" from the television show, FRIENDS. The second content item 104 may be content associated, automatically or manually, with a content association of "cool" and/or "famous," for example, in addition to the shared content association of "No." As a result, the combination of the two media content items presents information different than each of the media content items presented separately. In one embodiment, the expressive statement presented by the composite content item 266 may be a simple conglomeration of the content associations associated with the individual content items included in the composite content item 266. In another embodiment, an expressive statement that is different from the content associations included in the individual content items may be extracted or otherwise interpreted from the composite content item 266. This expressive statement, as stored by the associated content associations associated with the composite content item 266, will be used in correlating a searching user's intent to relevant content items, as described herein.

Figure 3:
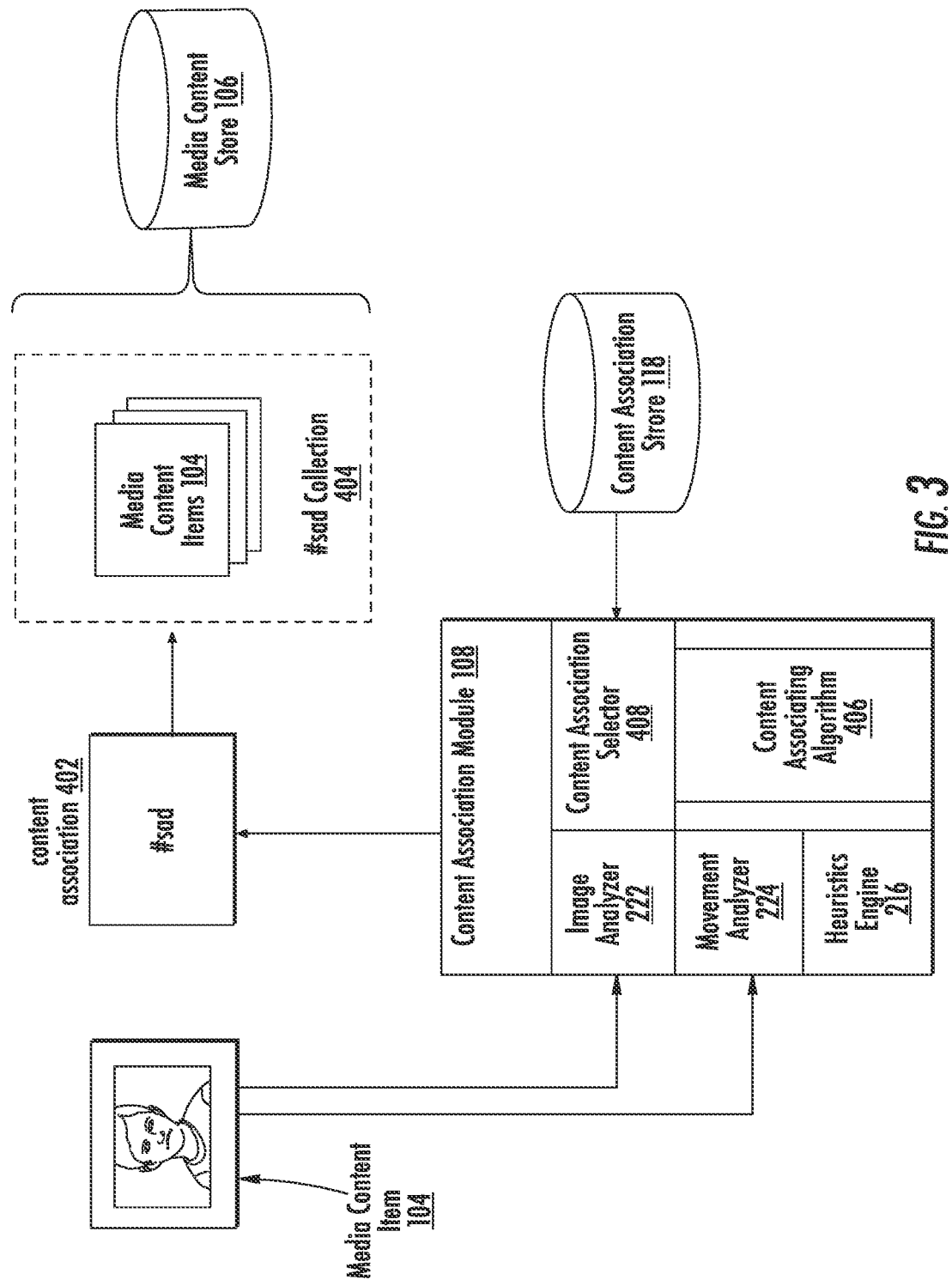
FIG. 3 is a high-level block diagram of a system for categorizing procured content in a media content management system according to aspects of the present disclosure.

FIG. 3 is a high-level block diagram of a system for categorizing procured content in a media content management system, according to some examples. A content associator module 108 may include a content associating algorithm 406 for automatically selecting a content association 402 for a media content item 104. The content associator module 108 may further include a content association selector 408 for selecting the content association 402 from the content association store 118. The content associator module 108 may operate in conjunction with or include an image analyzer 222, a movement analyzer 224, and a heuristics engine 216 to aide in automatically selecting a content association 402 for a media content item 104.

An image analyzer 222 may include computer vision techniques that recognize facial features, such as a face, eyes, a mouth smiling, a mouth frowning, and so forth. An image analyzer 222 may further include other computer vision techniques and/or pattern recognition algorithms to create baseline training sets for recognizing these facial characteristics. Similarly, a movement analyzer 224 may include computer vision techniques and/or pattern recognition algorithms, as well as machine learning and Bayesian inference techniques to recognize crying, laughing, falling, and other actions that may be modeled in similar ways. A movement analyzer 224 may also include eye-tracking functionality to identify a location of eyes within a set of images or an animated image. The eye-tracking functionality of the movement analyzer 224 may be used in conjunction with one or more other modules in the media content management system 100 to generate a new media content item 104, such as rendering a pair of sunglasses onto the animated set of images over the detected eyes within the images, for example. Other modules may be used to add text to media content items 104, such as the phrase "deal with it" to create and/or generate new media content items 104. A heuristics engine 216, as described earlier, may use various rules to arrive at conclusions based on received data. For example, as illustrated in FIG. 3, a media content item 104 may include a GIF of a baby crying, for example. An image analyzer 222 may analyze the frames of the GIF of the media content item 104 and determine facial characteristics such as a pair of eyes squinting, a mouth open in a frown-like position, and eyebrows raised. A movement analyzer 224 may identify that the media content item 104 includes a baby crying based on baseline models of babies crying and other machine learning techniques.

As a result, the content associator module 108 may select one or more content associations from a content association store 118, through a content association selector 408. The content associating algorithm 406 may include one or more heuristic rules from a heuristics engine 216 to automatically generate a content association for a media content item 104. In this example, a "#sad" content association 402 has been selected for the media content item 104. As described earlier, content associations may be associated with other content associations, such as a crying content association may be associated with a "#sad" content association 402. In this way, the media content item 104 of a baby crying may be included in the "#sad" collection 404 based on the automatically generated content association and stored in the media content store 106.

Figure 4:
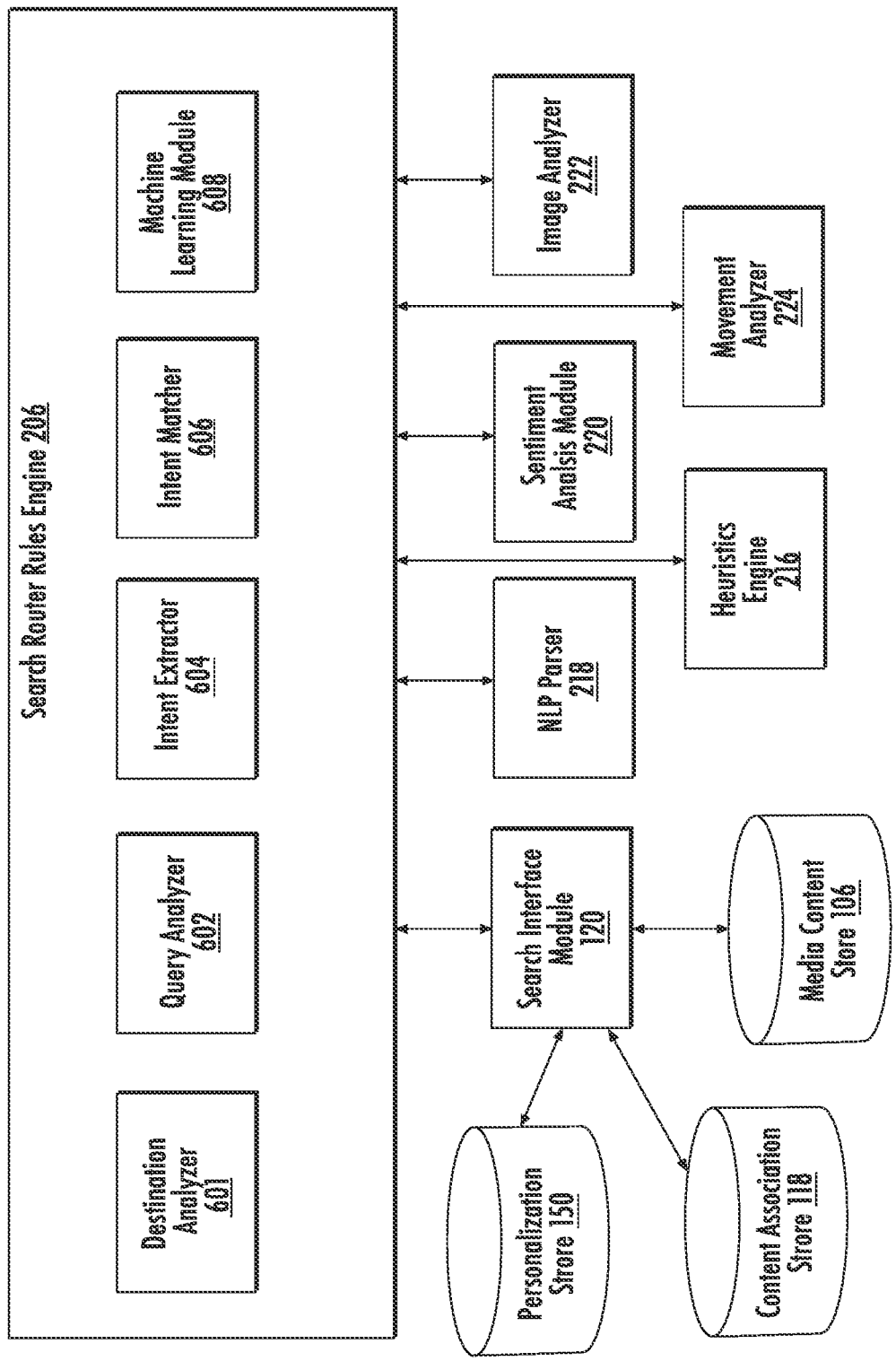
FIG. 4 is a high-level block diagram of a system for performing search to implement animated inputs in a dynamic interface according to aspects of the present disclosure.

FIG. 4 is a high-level block diagram of a system for performing search to implement animated inputs in a dynamic interface, according to some examples. A search router rules engine 206 may include a destination analyzer 601 can be configured to receive data that describes the destination for the media content item(s). Example data that describes the destination can include cultural data of a geographical region, data describing common attributes of media content items typically sent to the destination (e.g., posted the social media platform, posted to the website, and so forth). For instance, the data that describes the destination for the media content item(s) can include data describing media content items that have been previously shared by a particular computer application by other users.

The search router rules engine 206 may include a query analyzer 602, an intent extractor 604, an intent matcher 606, and a machine learning module 608. A query analyzer 602 may breakdown received text and/or picture into overlapping windows, in one embodiment. For example, a searching user may enter the search term "happy birthday" as a query. The query analyzer 602 may breakdown the query into words and partial words that overlap, such as "ha," "happy," "birth," "birthday," "happy birth," and "happy birthday." The query analyzer 602 may provide the words and partial words to the search interface module 120 for searching in the media content store 106 based on the words and partial words on the content associations of the associated media content items, in one embodiment.

In another embodiment, the query analyzer 602 may provide the words and partial words to the intent extractor 604. For example, the intent extractor 604 may have previously mapped or extracted intent from the query "happy birthday" to include an intent to celebrate a birthday. Thus, the term "happy birthday" may specifically be mapped only to content items having birthday elements, such as a cake, candles, the text string "happy birthday," a party, a person blowing out candles, and the like. The intent extractor 604 may further provide the words and partial words to a natural language processing (NLP) parser 218 to derive meaning and/or intent from the search terms. An NLP parser 218 may be particularly useful, in one embodiment, where a search term is unrecognized. For example, if the search term were "happy dia de los muertos" and the terms "dia de los muertos," Spanish for "day of the dead," were not included in a dictionary or corpus of learned terms, the intent extractor 604 may extract the intent of the searching user wishing to celebrate something happy based on the word "happy" being included in the search query. If, on the other hand, "muertos" is included in a dictionary or text strings included as metadata attributes of content items, then the NLP parser 218 may be relied upon to present content items associated with both the "happy" and "muertos" content associations.

An intent matcher 606 may, in one embodiment, be used in the search router rules engine 206 to match an intent of a searching user to one or more content associations in a content association store 118. Returning to the previous example, the term "happy" included in the search query "happy dia de los muertos" may cause the search query to be matched by the intent matcher 606 to a "#happy" content association for further queries. The term "muertos" may be matched to a "dead" content association and a "Halloween" content association, in one embodiment. Because "dia de los muertos" is not directly related to Halloween, but is actually a Mexican holiday occurring on November 1, some content items may not be presented. An intent matcher 606 may adjust the matches, in one embodiment, between search phrases and content associations, in one embodiment. The matches may be stored in the content association store 118, in one embodiment.

In another embodiment, the intent matcher 606 may, in conjunction with a machine learning module 608, analyze user feedback, such as selecting content items having both a "Halloween" attribute and a "skull" attribute when those items are presented in search results in response to the "happy dia de los muertos" search query. As a result, the intent matcher 606 may generate a new match between the search phrase "happy dia de los muertos" and content items having both the "Halloween" and "skull" content associations. In one embodiment, the intent matcher 606 may determine a likelihood score of intent match based on probabilistic methods and/or machine learning for each match. This score may be stored in the content association store 118 for each intent match. These scores may be further based on statistical inference algorithms as provided by the NLP parser 218 and machine learning module 608.

A machine learning module 608 may use various machine learning methods, such as supervised and unsupervised learning methods, Bayesian knowledge base, Bayesian network, nearest neighbor, random walk, and other methods to determine various outcomes based on received training data and received user feedback (based on whether viewing users selected/shared content items presented in a search result set). For example, sometimes a random content item is presented along with the content items having a certain attribute, such as the "#happy" content association. Other times, the same content item may be presented randomly among search results for a different content association, such as "dog." The randomly presented content item may not be associated with either the "#happy" content association or the "dog" content association, but searching and/or viewing users may frequently select and share the randomly presented content item. As a result, a machine learning module 608 may determine that the randomly presented content item is selected 80% of the time overall, 70% of the time when presented with content associated as "#happy," and 60% of the time when presented with content associated as "dog." The machine learning module 608 may be used to further automate the process and create a heuristic rule to automatically present the content item when a search query includes both terms "#happy" and "dog," as well as when a search query includes one of the terms. In one embodiment, a machine learning module 608 may associate, or relate, a content association to a content item based on the content item being selected among search results having a common attribute over a threshold percentage of time, such as 50%. Correlations such as these may also require administrator approval through a user interface, in accordance with at least one embodiment.

A search router rules engine 206 may further include rules for processing search queries to optimize processing time and to include search results even where no direct match exists in the media content management system 100. For example, the search router rules engine 206 may operate in conjunction with a sentiment analysis module 220, an image analyzer 222, and/or a movement analyzer 224 to analyze content items in the media content store 106 that do not have associated attributes. A sentiment analysis module 220 may be used to process words, partial words, and search queries to determine whether the intent includes positive, negative, or neutral connotations. An image analyzer 222 may be similarly used to process received images received as search queries to extract an intent of the searching user. For example, if the image is a photo captured by a mobile device directly sent as a query, the photo may be analyzed by the image analyzer 222 to detect visual characteristics, such as facial expressions and activities occurring in the photo. Further, a movement analyzer 224 may be used to detect actions, behaviors, and patterns of movement, such as laughing, crying, falling, shaking hands, first bumping, chest thumping, eye rolling, hair flipping, and so forth. Rules may be included in the search router rules engine 206 to associate identified behaviors, actions, activities, and/or facial expressions to one or more expressive statements that are stored as content associations in the content association store 118. These rules may be heuristic rules generated by a heuristics engine 216, in one embodiment.

Figure 5A:
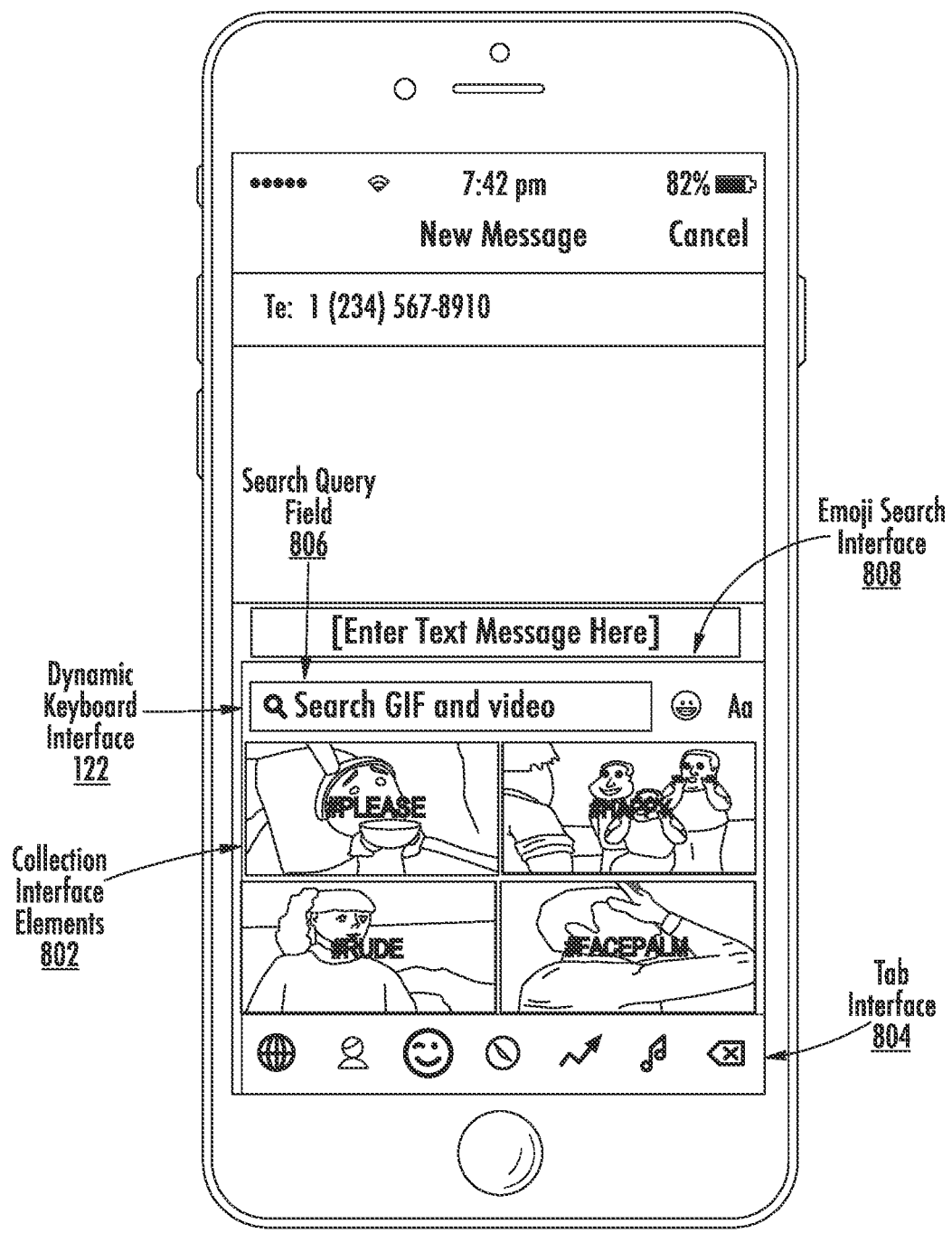
FIGS. 5A-C are example screenshots of a dynamic keyboard interface provided to interact with content in a media content management system according to aspects of the present disclosure.
Figure 5B:
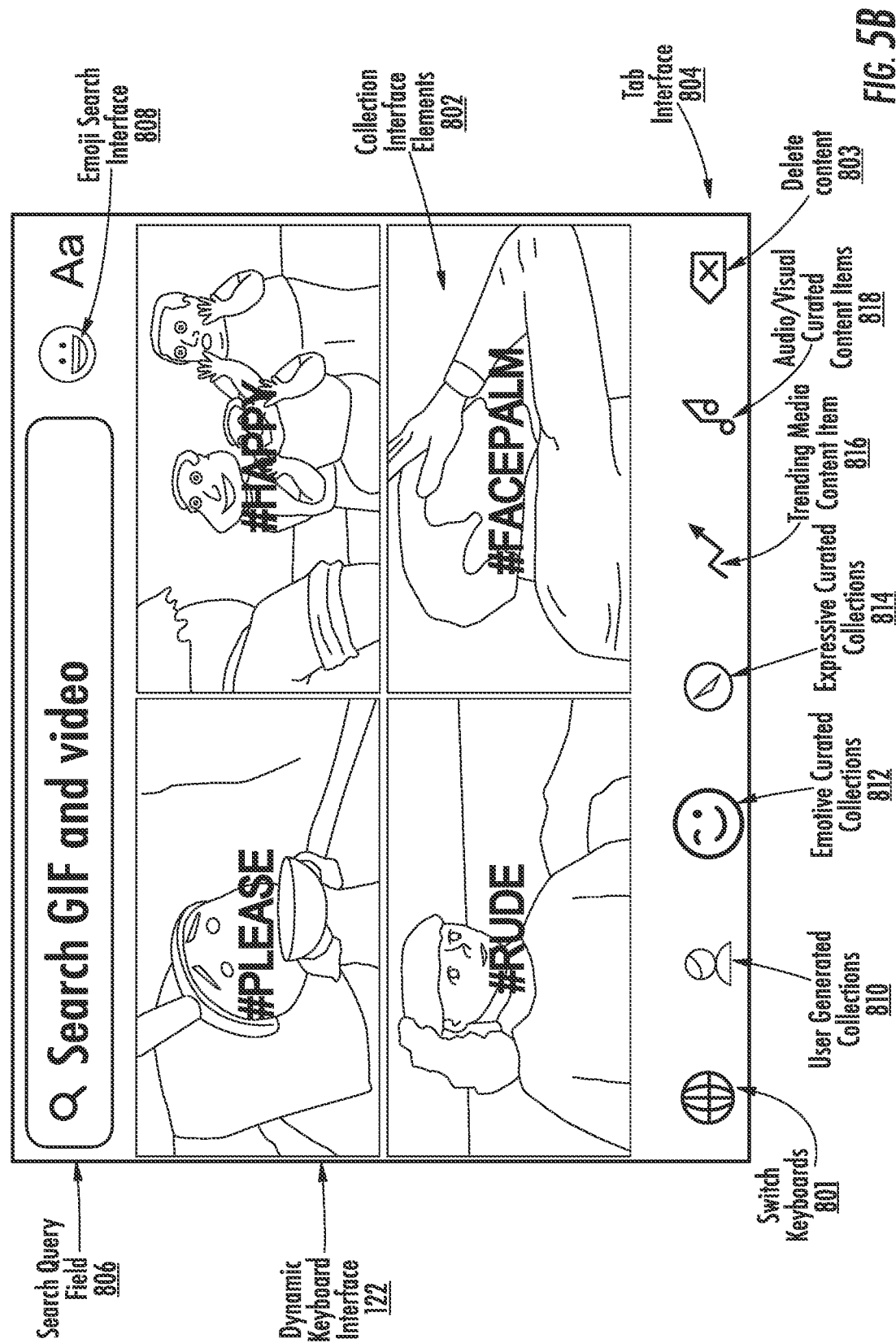
Figure 5C:
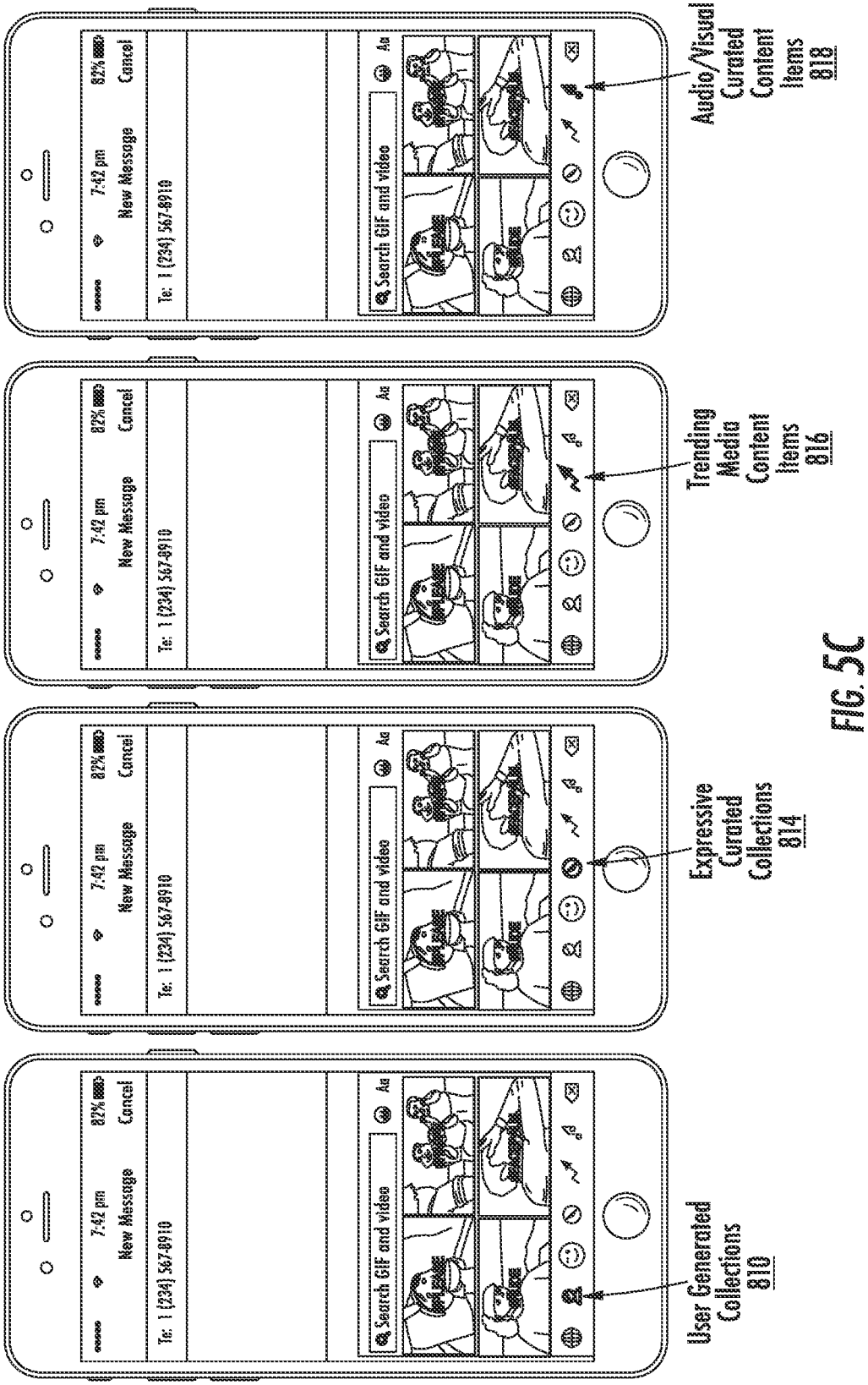

FIGS. 5A-C are example screenshots of a dynamic keyboard interface provided to interact with content in a media content management system, according to some examples. FIG. 6A illustrates an example screenshot of a dynamic keyboard interface 122 as provided on a mobile device through a native mobile application for texting, specifically the IMESSAGE platform through APPLE IOS. Collection interface elements 802 are provided in the dynamic keyboard interface 122, including a "#PLEASE" collection, a "#RUDE" collection, a "#HAPPY" collection, and a "#FACEPALM" collection. As a user selects one of the collection interface elements 802 in the dynamic keyboard interface 122, media content items 104 associated with the selected collection labeled by a content association may be rendered in the dynamic keyboard interface 122. Although a hashtag ('#') precedes the content associations of the collection, hashtags are not needed. Each of the collection interface elements 802 presented in the dynamic keyboard interface 122 include a media content item that is presented in animation concurrently, giving the viewing user a preview of the animations available in the collections. Because the collections represented by the collection interface elements 802 include media content items are rendered and presented in animation concurrently, a user may quickly browse through various collections represented by the collection interface elements 802. A tab interface 804 is also included in the dynamic keyboard interface 122. The tab interface 804 provides a navigation menu of the features and options available on the dynamic keyboard interface 122. As illustrated in FIG. A, an icon on the tab interface 804 is highlighted because that menu tab is currently selected. Icons included in the tab interface 804 may be animated as well. A search query field 806 is also included in the dynamic keyboard interface 122. The search query field 806 enables the viewing user to perform a search on the media content management system 100 using text strings, in one embodiment. Though not illustrated, the search query field 806 may, in other embodiments, receive images captured from the viewing user's mobile device as well as images stored on the viewing user's mobile device. The dynamic keyboard interface 122 also includes an emoji search interface 808 for searching the media content management system 100 using pictorial representations of expressions, or emoji.

FIG. 5B illustrates the dynamic keyboard interface 122 in further detail. The tab interface 804 may include an icon that navigates to user generated collections 810, an icon that navigates to emotive curated collections 812, an icon that navigates to expressive curated collections 814, an icon that navigates to trending media content items 816, and an icon that navigates to audio/visual curated content items 818, in one embodiment. As further illustrated in FIG. 5B, the tab interface 804 may include other icons for the user to interact with the mobile application on the mobile device, including an icon to switch keyboards 801 and an icon to delete content 803 entered onto the mobile application.

FIG. 5C illustrates example screenshots of the dynamic keyboard interface 122 in further detail for each icon of the tab interface 804 when selected. User generated collections 810 may include collections that have been procured by users through a share extension application. For example, a user may, through a web browser, browse to a web page including one or more media content items and launch a share extension application to capture one or more of the media content items and save them into a user generated collection 810. As illustrated in FIG. 5C, user generated collections 810 may include favorites, recent, saved, and "cute." In this example, the recent collection may include the most recently shared content items by the user using the media content management system 100 and/or the dynamic keyboard interface 122. The favorites, saved, and "cute" collections may be user-curated collections that include content items manually content associated or associated with the collections through either the share extension application or the dynamic keyboard interface, in one embodiment.

Figure 6:
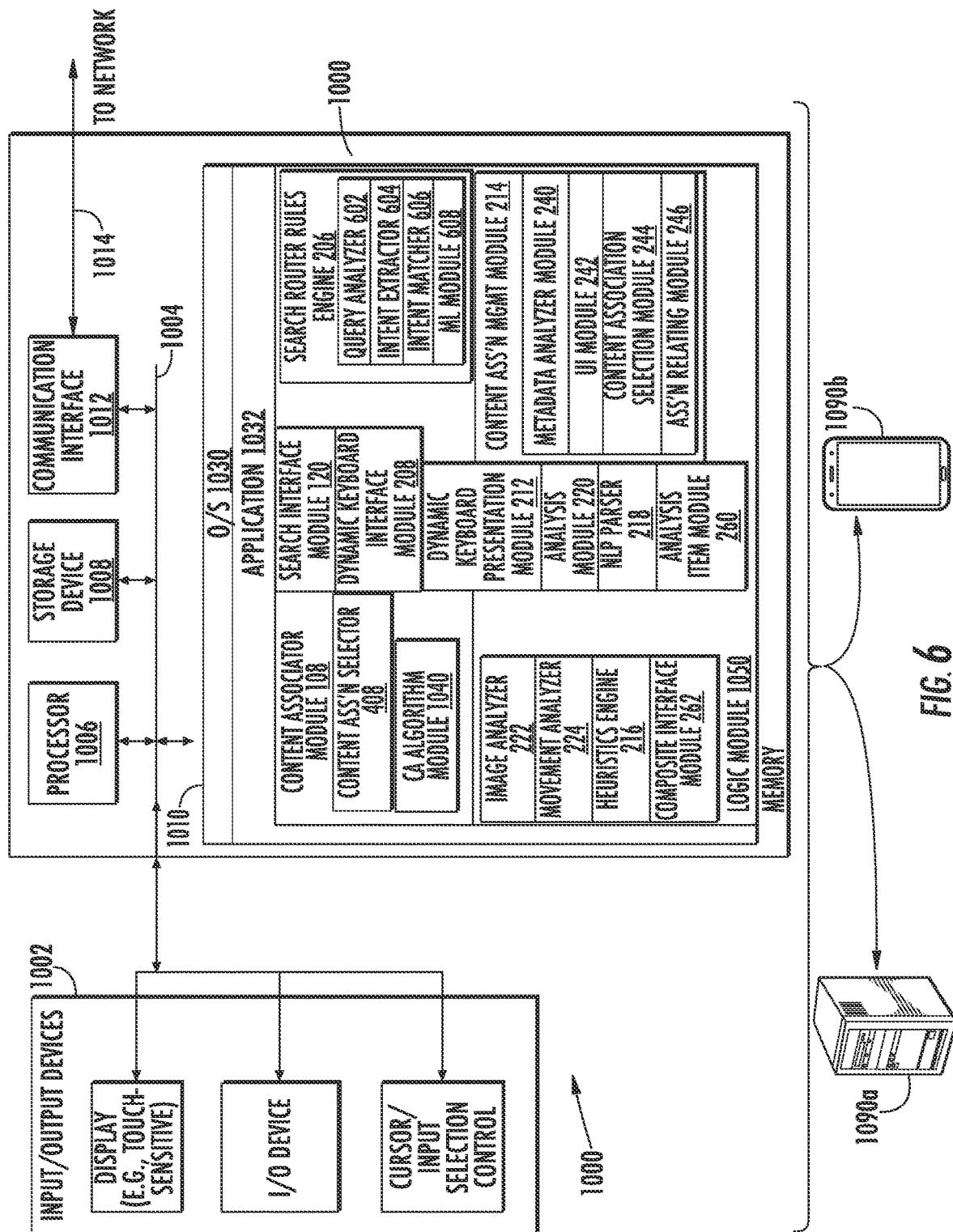
FIG. 6 illustrates an exemplary computing platform disposed in a device configured to procure, organize, and/or retrieve expressive media content according to aspects of the present disclosure.

FIG. 6 illustrates an exemplary computing platform disposed in a device configured to categorize procured content for performing search in a media content management system 100 in accordance with various embodiments. In some examples, computing platform 1000 may be used to implement computer programs, applications, methods, processes, algorithms, or other software to perform the above-described techniques.

In some cases, computing platform can be disposed in wearable device or implement, a mobile computing device 1090 *b*, or any other device, such as a computing device 1090 *a*.

Computing platform 1000 includes a bus 1004 or other communication mechanism for communicating information, which interconnects subsystems and devices, such as processor 1006, system memory 1010 (e.g., RAM, etc.), storage device 1008 (e.g., ROM, etc.), a communication interface 1012 (e.g., an Ethernet or wireless controller, a Bluetooth controller, etc.) to facilitate communications via a port on communication link 1014 to communicate, for example, with a computing device, including mobile computing and/or communication devices with processors. Processor 1006 can be implemented with one or more central processing units ("CPUs"), or one or more virtual processors, as well as any combination of CPUs and virtual processors. Computing platform 1000 exchanges data representing inputs and outputs via input-and-output devices 1002, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 1000 performs specific operations by processor 1006 executing one or more sequences of one or more instructions stored in system memory 1010, and computing platform 1000 can be implemented in a client-server arrangement, peer-to-peer arrangement, or as any mobile computing device, including smart phones and the like. Such instructions or data may be read into system memory 1010 from another computer readable medium, such as storage device 1008. In some examples, hard-wired circuitry may be used in place of or in combination with software instructions for implementation. Instructions may be embedded in software or firmware. The term "computer readable medium" refers to any tangible medium that participates in providing instructions to processor 1006 for execution. Such a medium may take many forms, including but not limited to, non-volatile media and volatile media. Non-volatile media includes, for example, optical or magnetic disks and the like. Volatile media includes dynamic memory, such as system memory 1010.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1004 for transmitting a computer data signal.

In some examples, execution of the sequences of instructions may be performed by computing platform 1000. According to some examples, computing platform 1000 can be coupled by communication link 1014 (e.g., a wired network, such as LAN, PSTN, or any wireless network, including WiFi of various standards and protocols, Blue Tooth®, Zig-Bee, etc.) to any other processor to perform the sequence of instructions in coordination with (or asynchronous to) one another. Computing platform 1000 may transmit and receive messages, data, and instructions, including program code (e.g., application code) through communication link 1014 and communication interface 1012. Received program code may be executed by processor 1006 as it is received, and/or stored in memory 1010 or other non-volatile storage for later execution.

In the example shown, system memory 1010 can include various modules that include executable instructions to implement functionalities described herein. System memory 1010 may include an operating system ("O/S") 1030, as well as an application 1032 and/or logic module 1050. In the example shown, system memory 1010 includes a content associator module 108 including a content association ("ass'n") selector module 408 and a content associating ("CA") algorithm module 1040. The system memory 1010 may also include an image analyzer 222, a movement analyzer 224, a heuristics engine 216, a search interface module 120, a dynamic keyboard interface module 208, a dynamic keyboard presentation module 212, a sentiment analysis module 220, a natural language processing (NLP) parser 218, a search router rules engine 206 including a query analyzer 602, an intent extractor 604, an intent matcher 606, and a machine learning (ML) module 608, a content association ("ass'n") management ("mgmt.") module 214 including a metadata analyzer module 240, a user interface module 242, a content association selection module 244, and an association ("ass'n") relating module 246. The system memory 1010 may further include a composite item module 260 and a composer interface module 262. One or more of the modules included in memory 1010 can be configured to provide or consume outputs to implement one or more functions described herein.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, a media content management system or one or more of its components, or any process or device described herein, can be in communication (e.g., wired or wirelessly) with a mobile device, such as a mobile phone or computing device, or can be disposed therein.

In some cases, a mobile device, or any networked computing device (not shown) in communication with an action alert controller or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, a dynamic keyboard presentation module 212 or any of its one or more components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

Example Methods

Figure 7:
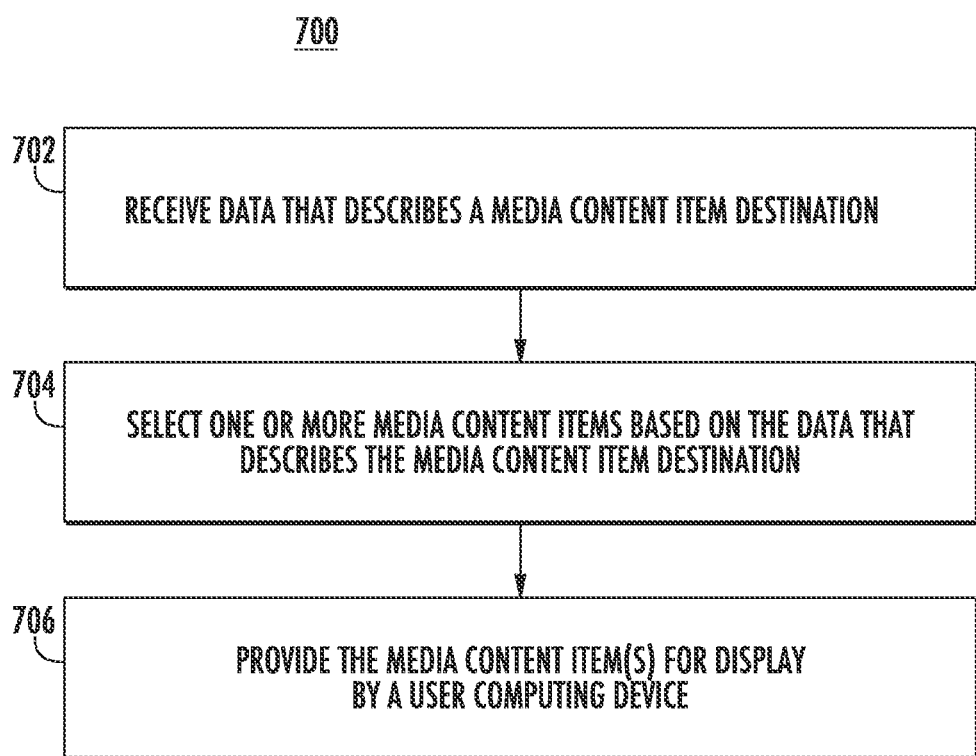
FIG. 7 depicts a flow chart diagram of an example method according to example embodiments of the present disclosure.

FIG. 7 depicts a flow chart diagram of a method 700 for retrieving according to example embodiments of the present disclosure. Although FIG. 7 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 702, the method 700 can include can receiving data that describes a destination (e.g., for a desired media content item), for example as described above with reference to FIGS. 1C and 1D. As an example, the user can select a recipient (e.g., another user) to which to send a message via a messaging application. The destination can be or include the recipient's computing device, and/or a location of the recipient's user computing device. As further examples, the destination can include the computer application, website, social networking platform (or location therein) as the destination.

At 704, the method 700 can include selecting one or more media content items based on the data that describes the destination for the media content item, for example as described above with reference to FIGS. 1C-2B and 4. The computing system can select the media content items based on a comparison of attributes of the destination and the media content items. Example attributes can include tone, emotional content, and aesthetic qualities (e.g., of text included in the media content items).

At 706, the method 700 can include providing the media content item(s) for display by the user computing device in a dynamic keyboard interface, for example as described above with reference to FIGS. 1B-1D and 5A-5C. The media content item(s) can be ranked and/or arranged for display (e.g., in the dynamic keyboard interface) based on the data that describes the destination for the media content item. The media content item(s) that are generally more relevant (e.g., due to being selected based on the destination for the media content item) can be displayed more prominently (e.g., at the top of a group of results, larger, etc.).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, a media content management system, including one or more components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising:
   receiving, by a computing system comprising one or more processors, data that describes a media content item destination, wherein the data that describes a media content item destination is descriptive of an intended recipient of a message being drafted, wherein a recipient computing device of the intended recipient differs from the user computing device;
   selecting, by the computing system, one or more target attributes based on the data that describes the media content item destination;
   selecting, by the computing system, a plurality of media content items based on the one or more target attributes, wherein the plurality of media content items comprise a plurality of animated images, wherein the plurality of media content items are selected based on the intended recipient of the message being drafted; and
   providing, by the computing system for display by a user computing device in a dynamic keyboard interface, the plurality of media content items, wherein the plurality of animated images are rendered with animation in the dynamic keyboard interface.

2. The computer-implemented method of claim 1, wherein the plurality of media content items are associated with one or more product producers.

3. The computer-implemented method of claim 1, wherein the one or more target attributes comprise one or more content branding attributes.

4. The computer-implemented method of claim 1, wherein the one or more target attributes comprise at least one of tone, text characteristics, duration, and emotion.

5. The computer-implemented method of claim 1, wherein the data that describes the media content item destination further describes a messaging application in which the media content item is to be inserted.

6. The computer-implemented method of claim 1, wherein the one or more target attributes comprise one or more content source attributes.

7. The computer-implemented method of claim 1, wherein the data that describes the media content item destination further describes an e-mail application in which the media content item is to be inserted.

8. The computer-implemented method of claim 1, wherein the data that describes the media content item destination describes a social networking platform in which the media content item is to be communicated.

9. The computer-implemented method of claim 1, wherein the data that describes the media content item destination describes a geographic location of the intended recipient of the message.

10. A computing system for media content item suggestion, the system comprising:
one or more processors; and
one or more non-transitory computer-readable media that collectively store instructions that, when executed by the one or more processors, cause the computing system to perform operations, the operations comprising:
receiving, by a user computing device, data that describes a media content item destination, wherein the data that describes a media content item destination is descriptive of an intended recipient of a message being drafted, wherein a recipient computing device of the intended recipient differs from the user computing device;
selecting one or more target attributes based on the data that describes the media content item destination;
selecting a plurality of media content items based on the one or more target attributes, wherein the plurality of media content items comprise a plurality of animated images, wherein the plurality of media content items are selected based on the intended recipient of the message being drafted; and
providing, for display by the user computing device in a dynamic keyboard interface, the plurality of media content items, wherein the plurality of animated images are rendered with animation in the dynamic keyboard interface.

11. The system of claim 10, further comprising receiving, by the user computing device, a search query for the media content item via the dynamic keyboard interface displayed by the user computing device, and wherein selecting the plurality of media content items based on the data that describes the media content item destination comprises selecting the one or more media content items additionally based on the search query.

12. The system of claim 10, wherein providing, for display the plurality of media content items comprises arranging the plurality of media content items for display based on the data that describes the media content item destination.

13. The system of claim 10, wherein one or more target attributes comprises a particular tone attribute, and wherein selecting the plurality of media content items based on the one or more target attributes comprises:
determining the plurality of media content items comprise a particular tone associated with the particular tone attribute.

14. One or more non-transitory computer-readable media that collectively store instructions that, when executed by one or more computing devices, cause the one or more computing devices to perform operations, the operations comprising:
receiving, by a user computing device, data that describes a media content item destination, wherein the data that describes a media content item destination is descriptive of an intended recipient of a message being drafted, wherein a recipient computing device of the intended recipient differs from the user computing device;
selecting one or more target attributes based on the data that describes the media content item destination;
selecting a plurality of media content items based on the one or more target attributes, wherein the plurality of media content items comprise a plurality of animated images, wherein the plurality of media content items are selected based on the intended recipient of the message being drafted; and
providing, for display by the user computing device in a dynamic keyboard interface, the plurality of media content items, wherein the plurality of animated images are rendered with animation in the dynamic keyboard interface.

15. The one or more non-transitory computer-readable media of claim 14, wherein the media content item destination further comprises a particular application of a plurality of applications for insertion.

16. The one or more non-transitory computer-readable media of claim 14, wherein one or more target attributes comprises a particular emotion attribute, and wherein selecting the plurality of media content items based on the one or more target attributes comprises:
determining the plurality of media content items is descriptive of a particular emotion associated with the particular emotion attribute.

17. The one or more non-transitory computer-readable media of claim 14, wherein one or more target attributes comprises a particular text characteristic attribute, and wherein selecting the plurality of media content items based on the one or more target attributes comprises:
determining the plurality of media content items comprise a particular text characteristic associated with the particular text characteristic attribute.

18. The one or more non-transitory computer-readable media of claim 14, wherein one or more target attributes comprises a particular duration attribute, and wherein selecting the plurality of media content items based on the one or more target attributes comprises:
determining the plurality of media content items comprises animation of a particular duration associated with the particular duration attribute.

* * * * *